(12) United States Patent
Raslambekov

(10) Patent No.: US 10,631,954 B1
(45) Date of Patent: Apr. 28, 2020

(54) SYSTEMS AND METHODS FOR DETERMINING ORTHODONTIC TREATMENTS

(71) Applicant: Oxilio Ltd, Larnaca (CY)

(72) Inventor: Islam Khasanovich Raslambekov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 16/703,498

(22) Filed: Dec. 4, 2019

(51) Int. Cl.
| | |
|---|---|
| A61C 7/00 | (2006.01) |
| A61C 19/05 | (2006.01) |
| A61C 9/00 | (2006.01) |
| G06T 19/00 | (2011.01) |
| A61C 13/34 | (2006.01) |

(52) U.S. Cl.
CPC ............. *A61C 7/002* (2013.01); *A61C 9/004* (2013.01); *A61C 13/34* (2013.01); *A61C 19/05* (2013.01); *G06T 19/00* (2013.01)

(58) Field of Classification Search
CPC ......... G06T 17/00–30; G06T 19/00–20; A61C 7/002; A61C 9/004; A61C 13/34; A61C 19/05
See application file for complete search history.

(56) References Cited

U.S. PATENT DOCUMENTS

| | | | |
|---|---|---|---|
| 6,250,918 B1 | 6/2001 | Sachdeva et al. | |
| 6,318,994 B1 | 11/2001 | Chishti et al. | |
| 6,334,853 B1 | 1/2002 | Kopelman et al. | |
| 7,160,110 B2 | 1/2007 | Imgrund et al. | |
| 8,897,902 B2 | 11/2014 | See et al. | |
| 9,536,020 B2 | 1/2017 | Wen | |
| 9,687,317 B2 | 6/2017 | Getto et al. | |
| 9,848,958 B2 | 12/2017 | Matov et al. | |
| 10,548,690 B2 * | 2/2020 | Wen ......................... | A61C 7/08 |
| 2008/0280246 A1 * | 11/2008 | Wen ........................ | H04N 7/147 |
| | | | 433/24 |

(Continued)

FOREIGN PATENT DOCUMENTS

WO 2018035524 A1 2/2018

OTHER PUBLICATIONS

Yau, Hong-Tzong, Tsan-Jui Yang, and Yi-Chen Chen. "Tooth model reconstruction based upon data fusion for orthodontic treatment simulation." Computers in biology and medicine 48 (2014): 8-16. (Year: 2014).*

(Continued)

*Primary Examiner* — Daniel F Hajnik
(74) *Attorney, Agent, or Firm* — BCF LLP

(57) ABSTRACT

A method of determining an orthodontic treatment comprising: obtaining a 3D model of a simulated position of upper and lower teeth following a simulated orthodontic treatment, the 3D model comprising a point cloud representation comprising a plurality of vector points; in a 3D grid having cells onto which the plurality of the vector points have been mapped, identifying cells containing vectors points representative of the upper teeth and applying a first mask to these cells; identifying cells containing vectors points representative of the lower teeth and applying a second mask to these cells; determining the simulated orthodontic treatment as the determined orthodontic treatment if the 3D grid does not include at least one cell which includes both the first mask and the second mask.

17 Claims, 12 Drawing Sheets

(56) References Cited

U.S. PATENT DOCUMENTS

| | | | |
|---|---|---|---|
| 2015/0142400 A1* | 5/2015 | Matov | A61C 7/002 703/6 |
| 2017/0100214 A1* | 4/2017 | Wen | A61C 7/002 |
| 2018/0104036 A1 | 4/2018 | Jaisson et al. | |
| 2018/0146934 A1 | 5/2018 | Ripoche et al. | |
| 2019/0105128 A1* | 4/2019 | Velazquez | A61C 7/002 |
| 2019/0175303 A1* | 6/2019 | Akopov | A61C 7/002 |

OTHER PUBLICATIONS

Li, Ziwei, et al. "A computer-aided visualization system for orthodontic treatment." 2014 4th IEEE International Conference on Information Science and Technology. IEEE, 2014. (Year: 2014).*

Gottschalk "OBBTree: A Hierarchical Structure for Rapid Interference Detection", Department of Computer Science, University of North Carolina, Chapel Hill, NC 27599-3175, http://www.cs.unc.edu/'geom/OBB/OBBT.html, 1996.

Abstract—Rodrigues "Interactive and Accurate Collision Detection in Virtual Orthodontics", Conference Paper—Jan. 2008, DOI: 10.2312/EGVE/EGVE08/065-072—Source: DBLP.

Kah "Collision Detection Using the Separating Axis Theorem", Aug 6, 2012.

* cited by examiner

SYSTEMS AND METHODS FOR DETERMINING ORTHODONTIC TREATMENTS

FIELD

The present technology relates to determining orthodontic treatments in general, and more specifically but not limited to, computer-implemented systems and methods for determining orthodontic treatments by detecting collisions between teeth during orthodontic treatment simulation.

BACKGROUND

In orthodontics, treatments for achieving alignment of malposed teeth in a subject include applying orthodontic appliances to the subject's teeth. One type of orthodontic appliance comprises pre-shaped orthodontic wires attached to brackets which are themselves attached to the teeth of the subject. The wires, also known as archwires, are typically made from shape memory alloys which have the ability to recover their shape after being deformed. Another type of orthodontic appliance comprises orthodontic aligners which are typically worn over the teeth of the top and/or bottom archforms in order to exert loads to the teeth to induce tooth movements or to retain tooth positions. Although they are removable, aligners are typically arranged to be worn for extended periods during the day and/or night.

A typical orthodontic treatment comprises a number of consecutive treatment steps in which different orthodontic appliances are consecutively used to apply different forces to the teeth as the alignment progresses. In the case of archwires and brackets used as the orthodontic appliance, archwires of different shapes and/or stiffness may be used. In the case of aligners, the aligners may have different shapes for applying different forces to the teeth.

In some cases, the treatment steps may be classified as an aligning stage, a levelling stage, a working stage, a finishing stage and a settling stage. In some cases, the treatment steps comprise an initial stage, a transitional stage and a finishing stage. The treatment stages may include an imposed orthodontic action such as rotation or linear movement of one or more teeth, development of the archform, a levelling of the arches, torque control or retention of the position. Generally, the earlier treatment stages apply more gentle forces compared to the later treatment stages.

Computer simulation of the movement of the subject's teeth may be used for planning one or more of the orthodontic treatment steps. During such simulation, movement of the teeth between a start position and a desired position is simulated. However, the simulated movement may prove inaccurate compared to the actual physical movement of the teeth because of potential collisions between the teeth during the movement. This means that the simulated orthodontic treatment does not reflect accurately the actual effect of the orthodontic treatment, making the planning of orthodontic treatments difficult.

Some prior art methods use Bounding Volume Hierarchies algorithms to reduce the number of operations required for collision detection, and for rendering the simulation more cost effective in terms of processing requirements, using 3D models of the teeth represented by polygonal meshes.

In U.S. Pat. No. 9,848,958, three dimensional (3D) mesh model object of teeth of a patient are generated, and bounding boxes are generated around each tooth. Overlapping bounding boxes are taken as an indication of potential occlusion of those teeth.

In U.S. Pat. No. 6,334,853 describes a method for obtaining a dental occlusion map of a 3D virtual computer model of teeth of upper and lower jaws of a mouth. The occlusion map indicates the distances between opposite regions on facing surfaces of opposite teeth of the upper and lower jaws of the mouth. The method includes the steps of determining the distances between opposite regions on opposite teeth of the upper and lower jaws of the mouth, and setting up a correspondence between the determined distances and regions on a mapping surface.

It is desired to provide improved methods and systems for determining orthodontic treatments.

SUMMARY

It is an object of the present technology to ameliorate at least some of the inconveniences present in the prior art.

In certain aspects and embodiments of the present technology, it is desired to determine collisions, during a simulated orthodontic treatment, between one or more of (i) adjacent teeth, (ii) opposing teeth, and (iii) orthodontic appliances, in the oral region of the subject.

In some conventional orthodontic simulation systems which do not take into account collisions, the teeth tend to move through each other. As this is not representative of the actual movement of the teeth of the subject during the orthodontic treatment, an outcome of the simulated orthodontic treatment and the actual orthodontic treatment will differ.

In other simulation systems, the sites of potential collision between the teeth are highlighted in the simulation, but these tend to lack accuracy. This again results in the simulated movement of the teeth during the orthodontic treatment differing from the actual movement of the teeth, limiting the usefulness of the orthodontic treatment simulation.

In existing computer-based systems which attempt to detect and highlight potential collisions during a simulated orthodontic treatment, a considerable amount of processing resources is required due to a large number of computations.

According to certain aspects and embodiments of the present technology, collision of teeth during a simulated orthodontic treatment are detected, allowing the adjustment or optimization of the simulated orthodontic treatment appropriately in order to avoid the collision.

According to certain other embodiments of the present technology, collision of upper and lower teeth of respective upper and lower archforms during a simulated orthodontic treatment are detected, allowing the adjustment of the simulated orthodontic treatment appropriately in order to avoid the collision. In certain embodiments, the orthodontic treatment comprises an appropriate spacing of the upper and lower archforms of the subject during the simulated orthodontic treatment.

From one aspect, there is provided a method of determining an orthodontic treatment for a subject, the method executable by a processor, the method comprising: obtaining a 3D model of upper teeth of an upper archform and lower teeth of a lower archform of a subject, the 3D model representative of a simulated position of the upper teeth and the lower teeth following a simulated orthodontic treatment, the 3D model comprising a point cloud representation of the upper teeth and the lower teeth, the point cloud representation comprising a plurality of vector points representative of the upper teeth and the lower teeth; identifying whether there is collision between the upper teeth and the lower teeth in the simulated position by: in a 3D grid in a simulation space onto which the plurality of the vector points representative of the upper teeth and the lower teeth have been mapped, identifying cells of the 3D grid containing vectors points representative of the upper teeth; identifying cells of the 3D grid containing vectors points representative of the lower teeth; applying a first mask to the cells in the 3D grid which include vector points representative of the upper teeth; applying a second mask to the cells in the 3D grid which include vector points representative of the lower teeth; determining if there is at least one cell in the 3D grid which includes both the first mask and the second mask; and selectively executing: if the 3D grid does not include at least one cell which includes both the first mask and the second mask, determining that there is no collision between the upper teeth and the lower teeth, and determining the simulated orthodontic treatment as the determined orthodontic treatment, if there is at least one cell in the 3D grid which includes both the first mask and the second mask, determining that there is collision between the upper teeth and the lower teeth, and adjusting the simulated orthodontic treatment.

According to certain embodiments, the method further comprises transforming each vector point of the plurality of vector points into a vector sphere representative of the upper teeth and the lower teeth, the vector sphere comprising a sphere having a predetermined diameter and centered at each vector point.

According to certain embodiments, the obtaining the point cloud representation of the upper teeth and the lower teeth comprises obtaining a triangular mesh 3D model of the upper teeth and the lower teeth and converting the triangular mesh 3D model of the upper teeth and the lower teeth to the point cloud representation.

According to certain embodiments, the method further comprises segmenting the 3D model of the upper teeth and the lower teeth to distinguish the upper teeth and the lower teeth.

According to certain embodiments, the method further comprises iteratively updating the point cloud representation of the upper teeth and the lower teeth with an adjusted position of the upper teeth and the lower teeth following the adjusted simulated orthodontic treatment, and determining whether there is collision or not between the upper teeth and the lower teeth, until it is determined that there is no collision between the upper teeth and the lower teeth.

According to certain embodiments, the method further comprises obtaining the 3D model representative of the simulated position of the upper teeth and the lower teeth following the simulated orthodontic treatment by executing the simulation of the movement of the upper teeth and the lower teeth from an initial position to the simulated position.

According to certain embodiments, the method further comprises executing the adjusted simulation of the upper teeth and the lower teeth by adapting a simulated movement of at least one of the upper teeth and the lower teeth from the simulated position to an adjusted simulated position.

According to certain embodiments, the adapted simulated movement is representative of a shorter distance of movement of the upper teeth and the lower teeth from one another to the adjusted simulated position.

According to certain embodiments, the method further comprises detecting one or more of false positives and false negatives.

According to certain embodiments, the method further comprises identifying a magnitude of collision of the upper teeth and the lower teeth, and adjusting the simulated position of the upper teeth and the lower teeth by an amount proportional to the identified magnitude of collision.

According to certain embodiments, the method further comprises sending instructions to a display device operably connected to the processor to display the collision as a pictorial representation of the collision or as an alphanumerical representation of the collision.

According to certain embodiments, the method further comprises designing the orthodontic appliance to administer the confirmed orthodontic treatment.

According to certain embodiments, the method further comprises sending instructions to a manufacturing apparatus operably connected to the processor for making at least a component of the orthodontic appliance to administer the confirmed orthodontic treatment.

According to certain embodiments, the method further comprises mapping the plurality of vector points representative of the upper teeth and the lower teeth onto the 3D grid of the simulation space.

According to certain embodiments, the method further comprises segmenting the 3D model of one or both of the upper teeth and the lower teeth to distinguish individual teeth of one or both of the upper teeth and the lower teeth, and wherein the method comprises identifying whether there is collision between a given upper tooth of the upper teeth and a given lower tooth of the lower teeth by: identifying cells of the 3D grid containing vector points representative of the given upper tooth of the upper teeth; identifying cells of the 3D grid containing vectors points representative of the given lower tooth of the lower teeth; applying a first mask to the cells in the 3D grid which include vector points representative of the given upper tooth of the upper teeth; applying a second mask to the cells in the 3D grid which include vector points representative of the given lower tooth of the lower teeth; determining if there is at least one cell in the 3D grid which includes both the first mask and the second mask.

According to certain embodiments, the 3D model representative of a simulated position of the upper teeth and the lower teeth following a simulated orthodontic treatment includes a 3D model of an orthodontic appliance associated with one or both of the upper and the lower teeth, the 3D model representative of a simulated position of the orthodontic appliance relative to the one or both of the upper teeth and the lower teeth, the 3D model of the orthodontic appliance comprising a point cloud representation of the orthodontic appliance, the point cloud representation comprising a plurality of vector points representative of the orthodontic appliance; identifying whether there is collision between the orthodontic appliance and the one or both of the upper teeth and the lower teeth in the simulated position by: in a 3D grid in a simulation space onto which the plurality of the vector points representative of the upper teeth and the lower teeth have been mapped, identifying cells of the 3D grid containing vectors points representative of the one or both of the upper teeth and the lower teeth; identifying cells of the 3D grid containing vectors points representative of the orthodontic appliance; applying a first mask to the cells in the 3D grid which include vector points representative of the one or both of the upper teeth and the lower teeth; applying a second mask to the cells in the 3D grid which include vector points representative of the orthodontic appliance; and determining if there is at least one cell in the 3D grid which includes both the first mask and the second mask.

According to certain embodiments, the 3D model representative of a simulated position of the upper teeth and the lower teeth following a simulated orthodontic treatment includes a 3D model of a first orthodontic appliance and a second orthodontic appliance associated with one or both of the upper and the lower teeth, the 3D model representative of a simulated position of the first orthodontic appliance and the second orthodontic appliance relative to the one or both of the upper teeth and the lower teeth, the 3D model of the first orthodontic appliance and the second orthodontic appliance comprising a point cloud representation of the first orthodontic appliance and the second orthodontic appliance, the point cloud representation comprising a plurality of vector points representative of the first orthodontic appliance and the second orthodontic appliance; identifying whether there is collision between the first orthodontic appliance and the second orthodontic appliance in the simulated position by: in a 3D grid in a simulation space onto which the plurality of the vector points representative of the upper teeth and the lower teeth have been mapped, identifying cells of the 3D grid containing vectors points representative of the first orthodontic appliance; identifying cells of the 3D grid containing vectors points representative of the second orthodontic appliance; applying a first mask to the cells in the 3D grid which include vector points representative of the first orthodontic appliance; applying a second mask to cells in the 3D grid which include vector points representative of the second orthodontic appliance; and determining if there is at least one cell in the 3D grid which includes both the first mask and the second mask.

In certain embodiments of the present technology, collision detection between one or more potentially colliding items in the oral space of a subject (e.g. adjacent teeth, portions of one or more appliances associated with the teeth) can be detected accurately and with limited computer resources. Advantageously, the use of point cloud representations and measuring only distances of vector points in cells of the 3D grid associated with overlapping areas of boundary boxes associated with the potentially colliding items, is not overly demanding from a perspective of required computer resources.

During tooth motion simulation the spatial decomposition needs to be rebuilt. In the case of a bounding volume hierarchy (BVH), such as bi-tree, kd-tree, the rebuilding process is computationally demanding, which requires more powerful and expensive computer hardware. The computational demand can also lead to technical problems, where certain operations are not possible to complete.

Conversely, the rebuilding of a regular grid with redistribution of point cloud, as provided by embodiments of the present technology, is less computationally expensive. Operations are able to be completed.

Furthermore, the relatively narrow intersection checks between point cloud spheres are considerably less expensive in terms of computation compared to traditional exact separating axis tests (SAT).

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
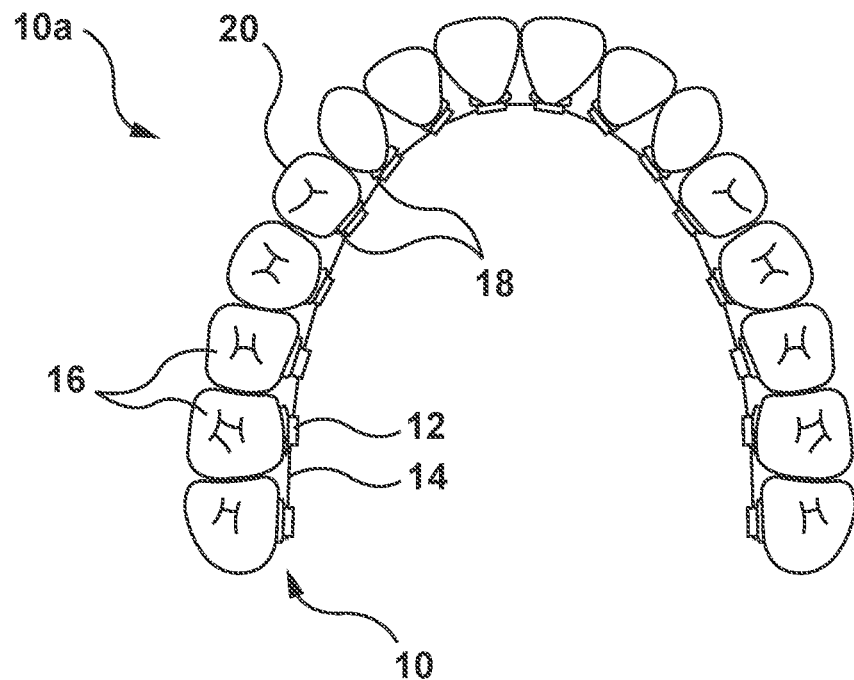
FIG. 1 is a schematic illustration of teeth of a lower archform of a patient showing a bracket and archwire type orthodontic appliance attached to the teeth for applying an orthodontic treatment to the teeth.

It should be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Broadly embodiments of the present technology are directed to computer-implemented methods and systems for determining or optimizing an orthodontic treatment. Other embodiments of the present technology are directed to computer-implemented methods and systems for designing orthodontic appliances for providing a determined orthodontic treatment. In order to facilitate an appreciation of the present technology, examples of orthodontic treatments and orthodontic appliances resulting from certain embodiments of the present technology will be described below, before describing the systems and methods relating to the present technology.

Orthodontic Treatments Using Orthodontic Appliances

Orthodontic treatments are used for treating different conditions relating to teeth misalignment or malocclusion, including but not limited to one or more of: tooth rotation, tooth intrusion/extrusion, tooth translation, and interdental space management. Interdental space management may include one or more of closing embrasures, creating interproximal contacts, opening embrasures, and eliminating interproximal contacts.

Orthodontic appliances 10 used in certain optimized or determined orthodontic treatments, according to certain embodiments of the present technology, include bracket/archwire systems 10a (FIGS. 1 and 2), or aligner systems 10b (FIGS. 3 and 4), amongst others.

Figure 2:
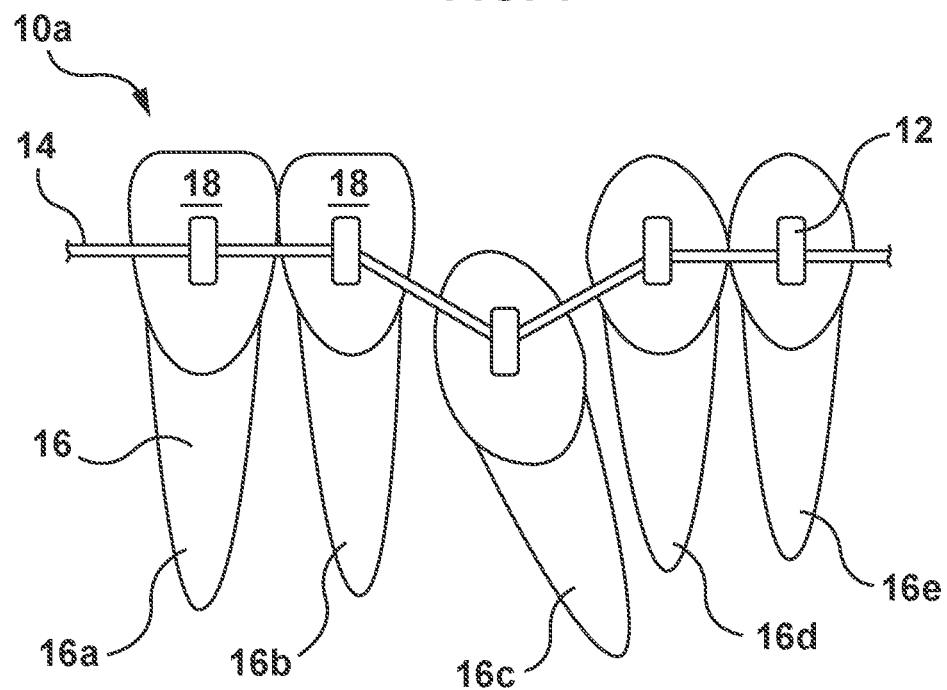
FIG. 2 is a schematic illustration of five of the teeth of FIG. 1 including the orthodontic appliance viewed from the side.

In the bracket/archwire system 10a of FIGS. 1 and 2, according to certain embodiments, there is provided a bracket 12 and an archwire 14. The bracket/archwire system 10a is depicted as applied to the teeth of a lower archform of a subject (not shown), with the brackets 12 being attached to internal surfaces 18 of the teeth 16 in a lingual configuration. However, it is contemplated that the orthodontic appliance 10 may be applied in other configurations, such as in a buccal configuration (attached to external surfaces 20 (outer-sides) of the teeth 16 of the lower jaw), for example. It is also contemplated that in other embodiments of the present technology, the orthodontic appliance 10 may be applied on teeth 16 of an upper archform of the subject in any one of a palatal configuration (attached to inner-sides of teeth of the upper jaw) and a labial configuration (attached to outer-sides of the teeth of the upper jaw) (not shown).

The brackets 12 are provided on respective teeth 16 (shown individually as 16a, 16b, 16c, 16d, 16e in FIG. 2), and the archwire 14 extends between, and is connected to, each of the brackets 12. In the illustrated example, the subject has a malocclusion—that is, a misalignment—of the tooth 16c for which the orthodontic treatment includes an upward movement of the tooth 16c so that the tooth 16c is aligned with neighboring the teeth 16a, 16b, 16d, 16e. The archwire 14 is made of a shape memory alloy, such as Nitinol™ and is shaped such that it exerts an upward force to the tooth 16c in use. The archwire 14 can also be made of any other shape memory alloy, or of a material with elastic properties. In certain embodiments, the bracket/archwire system 10a is designed to impart the orthodontic treatment determined by certain embodiments of the methods and systems, which will be described below.

Figure 3:
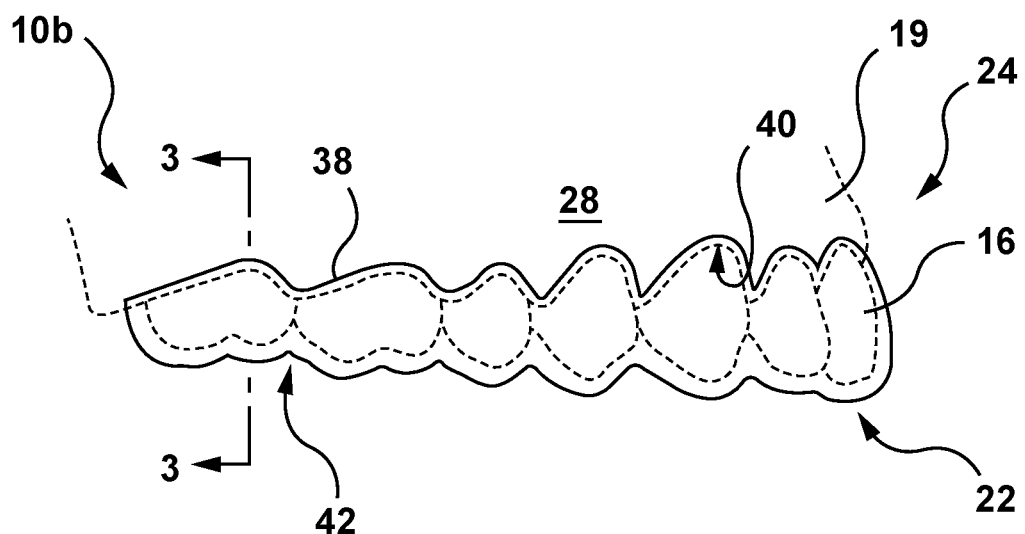
FIG. 3 is a schematic illustration of some teeth of an upper archform of another patient showing an aligner type orthodontic appliance for applying an orthodontic treatment to the teeth.
Figure 4:
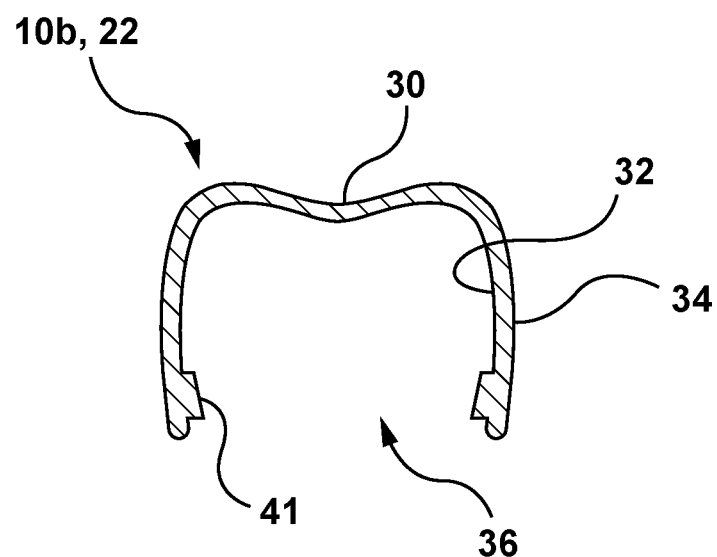
FIG. 4 is a cross-sectional view through the line 3-3' of the aligner of FIG. 3, with the teeth omitted for clarity.

In the aligner system 10b of FIGS. 3 and 4, according to certain embodiments, there is provided an aligner 22 made according to certain aspects and non-limiting embodiments of the present technology, and arranged to impart the orthodontic treatment determined or optimized by methods and systems of the present technology.

As illustrated in FIG. 3, the aligner 22 is for an upper archform 24 (also referred to as "upper arch" or "upper dental arch") of another subject. The upper arch 24 comprises teeth 16 and gums 19. In other embodiments (not shown), the aligner 22 is provided for a lower dental arch of the subject. In yet other embodiments, aligners 22 for both the lower arch and the upper arch 24 are provided.

The aligner 22 comprises an aligner body 30 having an inner surface 32 and an outer surface 34. The inner surface 32 defines a channel 36 for receiving at least some teeth 16 of the upper arch of the subject. At least one edge 38 of the channel 36 is shaped for intimately following the subject's gums 28 along a gumline 40 of the subject. In the embodiment of FIGS. 3 and 4, the aligner 22 is arranged to receive all the teeth 16 of the upper arch 24 of the subject. In certain other embodiments, the aligner 22 is arranged to receive some, not all, of the teeth 16 of the subject.

According to certain embodiments, a thickness of the aligner body 30, measurable from the inner surface 32 to the outer surface 34 along a direction substantially normal to the inner surface 32, is substantially uniform across the aligner body 30.

In other embodiments, the thickness of the aligner body 30 is variable. For example, in some embodiments, the aligner 10 may further include retentive features for retaining the aligner 22 with respect to the teeth 16. Such retentive features can be for example aligner blocks extending outwardly from the inner surface 32 to engage the teeth 16 in use. Other retentive elements can be aligner recesses defined in the inner surface 32 and sized to engagingly receive blocks affixed to the teeth 16 (not shown).

The aligner 22 is made of a polymer, such as a thermoplastic material. In certain embodiments, the aligner 22 is made of poly-vinyl chloride (PVC). In certain other embodiments, the aligner 22 is made of polyethylene terephthalate glycol (PETG). Other suitable materials can also be used to form the aligner 22. In the case of PETG and PVC, the aligner 22 is substantially transparent. The aligner 22 may be made of other materials having properties that are typically desirable in aligners 22, such as one or more of: low surface roughness, high translucency and mechanical strength adapted for bearing typical orthodontic loads.

It will be appreciated that the present technology can be applied to design and/or make different types, shapes, sizes and configurations of orthodontic appliances 10, such as, without limitation, multi-strand wires, strips, retainers, and plates. It will also be appreciated that the orthodontic appliance 10 may be used for treating any type of teeth misalignment or malocclusion.

Orthodontic treatments using orthodontic appliances 10, such as the bracket/archwire system 10a of FIGS. 1 and 2, or the aligner system 10b of FIGS. 3 and 4, comprise sequential treatment steps, in certain embodiments, in which different orthodontic appliances 10 are applied to the teeth 16 at each treatment step to apply different forces. In some orthodontic treatments, there is an initial stage where the teeth 16 are first treated for leveling and alignment. If the orthodontic appliance 10 comprises brackets 12 and archwires 14, archwires 14 which generate a continuous and light force over a relatively longer period of time are generally preferred for this initial stage. In other stages, a stronger force may be required for a relatively shorter period. The material type and diameter of the archwire 14 influences the forces applied to the teeth 16. Generally, archwires 14 with a broader diameter exert a higher force than narrower archwires 14. Material properties such as strength, stiffness and elasticity, as well as shape memory properties also influence the forces applied to the teeth 16. Therefore, there are many parameter combinations to consider when designing the orthodontic treatment and each of the treatment steps.

Figure 5:
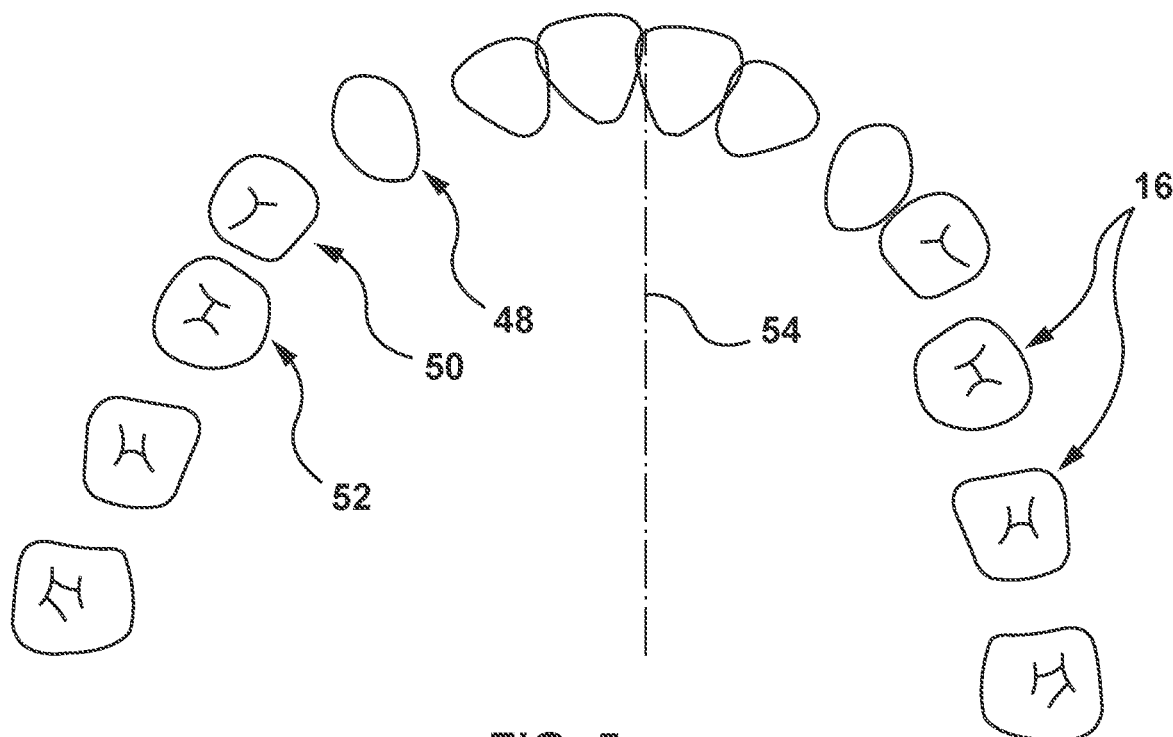
FIG. 5 depicts a representation of initial and desired positions of teeth of a subject in planning an orthodontic treatment.

Referring now to FIG. 5, generally, in determining the orthodontic treatment, an initial position 42 of a given tooth 16 is determined, such as by imaging of the patient's teeth 16 or by taking a physical mold. A desired position 44 of the teeth 16 is then identified. This can be performed manually, semi-automatically or automatically. In certain embodiments, the desired position 44 is determined by an orthodontist or other medical practitioner. Depending on the initial and desired positions 42, 44 of the tooth 16, a trajectory 46 of the movement of the tooth 16 from the initial position 42 to the desired position 44 is defined. In certain embodiments, the trajectory is one or more of a direct linear path, a plurality of stepped linear paths and a rotational path.

Figure 6:
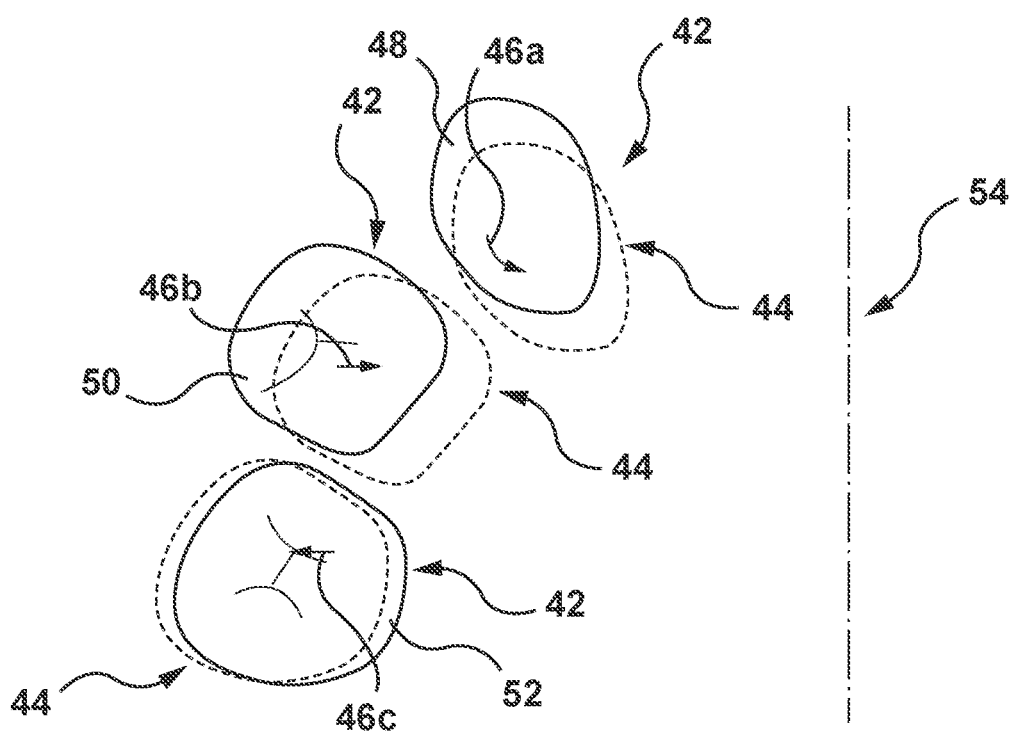
FIG. 6 is a zoomed-in view of three of the teeth of FIG. 5.

FIG. 5 depicts a representation of the initial and desired positions 42, 44 of the teeth 16 of the subject in the lower jaw, and FIG. 6 shows an enlarged view of three of the teeth 16 of FIG. 5: a lower left lateral tooth 48, a lower left cuspid tooth 50 and a lower left first bicuspid tooth 52. The initial positions 42 of these three teeth 48, 50, 52 are shown as a solid line. The desired positions 44 of each of these three teeth 48, 50, 52 are shown in dotted line. As can be seen, to be positioned in the desired position 44, the lower left lateral tooth 48 will need to be moved laterally and rotationally along a trajectory 46a, the lower left cuspid tooth 50 will need to be moved linearly towards the middle 48 of the jaw along the trajectory 46b, and the lower left first bicuspid 52 will need to be moved linearly away from the middle 48 of the jaw along the trajectory 46*c*.

The orthodontic treatment may comprise a number of treatment steps for moving the given tooth 16 from the initial position 42 to the desired position 44. In other words, the given tooth would be moved from the initial position 42 to the desired position 44 in stages. Each stage may be determined by a different load provided by a different orthodontic appliance 10. It may be determined, for example, that the given tooth 16 is to be moved 3 mm in three consecutive treatment step in order to minimize any damage to the subject's gums 28 and tooth roots. Certain methods of determination of orthodontic treatment steps in orthodontic treatments are described in U.S. Ser. No. 16/132,995 filed Sep. 17, 2018, the contents of which are incorporated herein.

However, in some cases, the movement of the given tooth 16 from the initial position 42 to the desired position 44 along the trajectory 46 which is a direct linear path may not be possible due to a possible collision with another tooth 16 or another structure, such as a part of the orthodontic appliance applied to the teeth, whilst moving from the initial position 42 to the desired position 44.

Figure 7:
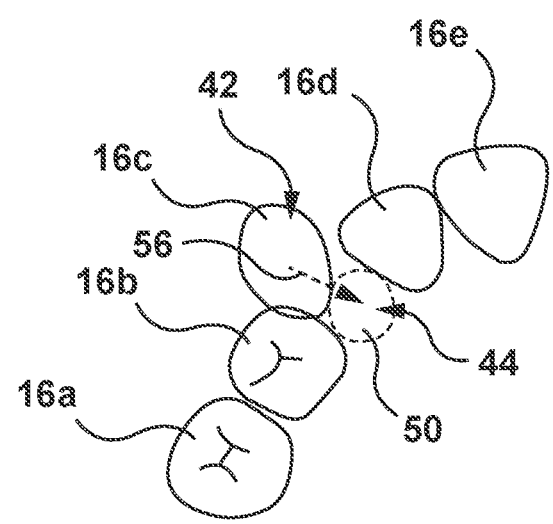
FIG. 7 depicts a representation of the initial and desired positions of the teeth of FIG. 2.

FIG. 7 depicts a schematic illustration of an example where such a tooth-tooth collision would occur. In the example of FIG. 7, the teeth 16*a*, 16*b*, 16*c*, 16*d*, and 16*e* of FIG. 2 are depicted, with the trajectory 46 of the tooth 16*c* (of FIG. 2) as a direct path illustrated to move the tooth 16*c* between the initial position 42 and the desired position 44. As can be seen, the given tooth 16*c* would collide with tooth 16*b* at a collision point 56. This would mean that if the orthodontic treatment is defined along the trajectory 46 being a direct path and not taking into account the collision, the actual movement of the tooth 16*c* and the actual position of the tooth 16*c* after the orthodontic treatment would differ from the desired position 44. The consequences therefore of not taking into account such collisions are serious, and can also impact the movement of other teeth adjacent or close to the tooth 16*c*.

As will be described below, methods and systems of the present technology can predict such potential collisions in order to determine the orthodontic treatment or to fine-tune the orthodontic treatment. Developers have discovered that identification of such potential collisions can be used to adapt the orthodontic treatment, such as the trajectory 46 for moving the tooth 16 from the initial position 42 to the desired position 44 in one or more steps of the orthodontic treatment, to avoid the collision. Identification of the potential collision can also enable the clinician to avoid the collision by other means such as removing enamel from one of the teeth 16 involved in the potential collision.

Figure 8:
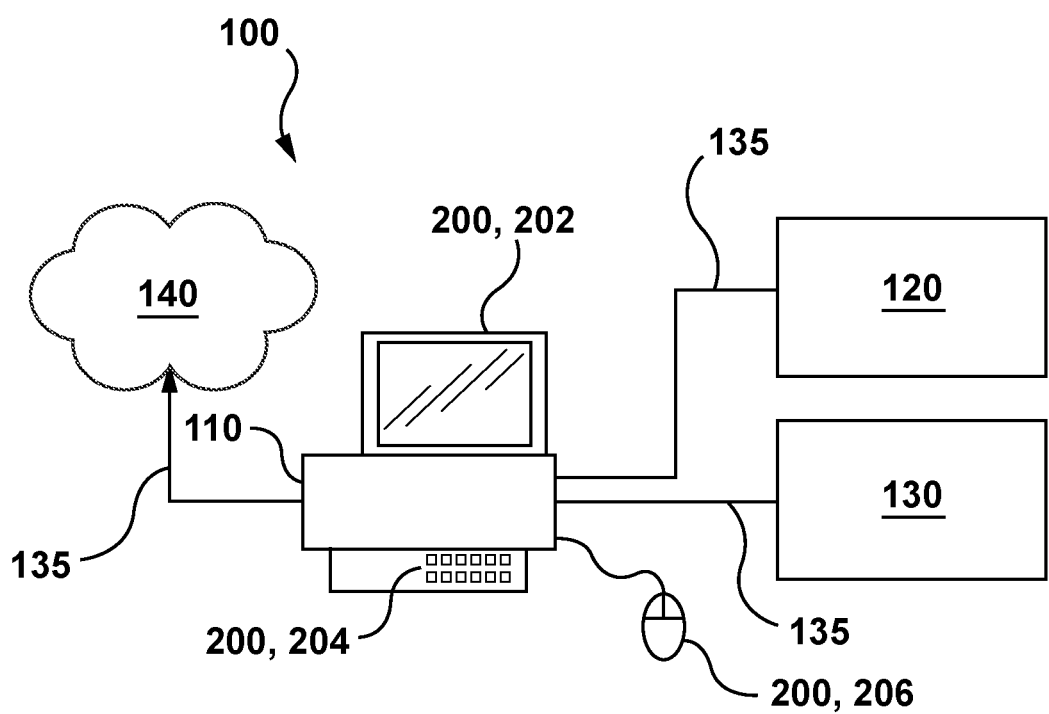
FIG. 8 is a schematic illustration of a system for determining an orthodontic treatment for a subject as implemented in accordance with at least some non-limiting embodiments of the present technology.

Turning now to FIG. 8, a system 100 suitable for determining the orthodontic treatment and/or for making the orthodontic appliance 10 according to the determined orthodontic treatment will be described, according to aspects and embodiments of the present technology. By "determining the orthodontic treatment" is meant one or both of: validating a proposed orthodontic treatment, and adapting the proposed orthodontic treatment to optimize the proposed orthodontic treatment.

System

With reference to FIG. 8, there is depicted a non-limiting example of a system 100 as contemplated in at least some embodiments of the present technology. Broadly speaking, the system 100 is configured to execute one or more of (i) process information associated with a subject, (ii) process information associated with a proposed orthodontic treatment, (iii) determine information relating to a proposed orthodontic treatment or adapted orthodontic treatment, (iv) generate 3D representations of at least some components of an orthodontic appliance 10 based on that information, and (v) manufacture (and/or generate instructions for triggering manufacture of) the at least some components of the orthodontic appliance 10 based on the respective 3D representations.

As will be described in greater detail below, the system 100 is configured to acquire and process information representative of at least a portion of an oral region of the subject. The oral region can include one or more of the teeth 16 and/or gums 28 of the upper arch 24 or the lower arch (such as those illustrated in FIGS. 1-7). The information representative of at least a portion of an oral region of the subject includes image data in certain embodiments.

In certain embodiments, the system 100 is configured to process this information for designing the orthodontic treatment for the subject which may include at least some components of the orthodontic appliance 10 to be applied in the orthodontic treatment, such as, for example, the aligner system 10*b* of FIGS. 3 and 4, the bracket/archwire system 10*a* of FIGS. 1 and 2.

In certain embodiments of the present technology, the system 100 is configured to process the information representative of at least a portion of the oral region of the subject for designing at least some components of the orthodontic treatment or the orthodontic appliance 10 with minimal or no operator intervention (e.g., with little or no direct operator control). Put another way, the system 100 may be configured to design at least some components of the orthodontic appliance 10 or the orthodontic treatment in an automatic or semi-automatic manner. For example, to that end, in at least some embodiments of the present technology, the system 100 may be configured to employ computer-readable instructions (such as software, for example) for auto-generating at least some components of the orthodontic appliance or the orthodontic treatment.

As it will also be described in greater detail below, the system 100 may be configured to manufacture (and/or generate data indicative of instructions for manufacturing) at least some components of the orthodontic appliance 10. For example, the system 100 may be configured to (i) process information indicative of the at least some components of the orthodontic appliance 10 as designed by the operator and/or auto-generated by the system 100 and (ii) manufacture (and/or provide instructions for manufacturing) these components in a variety of ways.

However, in other embodiments of the present technology, the system 100 may be configured to manufacture (and/or generate data indicative of instructions for manufacturing) the at least some components of the orthodontic appliance 10 with minimal or no operator intervention (e.g., with little or no direct operator control). Put another way, the system 100 may be configured to manufacture (and/or generate data indicative of instructions for manufacturing) the at least some components of the orthodontic appliance 10 in an automatic or semi-automatic manner. For example, to that end, in at least some embodiments of the present technology, the system 100 may be configured to employ computer-readable instructions (such as software, for example) for auto-manufacturing (and/or generating data indicative of instructions for auto-manufacturing) the at least some components of an orthodontic appliance 10.

In summary, it is contemplated that in at least some embodiments of the present technology, the system 100 may or may not require operator input or interaction for generating 3D representations of at least some orthodontic appliances 10 and for manufacturing (and/or generating data indicative of instructions for manufacturing) the at least some orthodontic appliances 10.

As depicted in FIG. 8, in at least some embodiments of the present technology, the system 100 comprises a computer system 110 operatively communicable with one or both of an imaging device 120 and a manufacturing apparatus 130 through a communication network 135, which will now be discussed in turn.

Computer System

Figure 9:
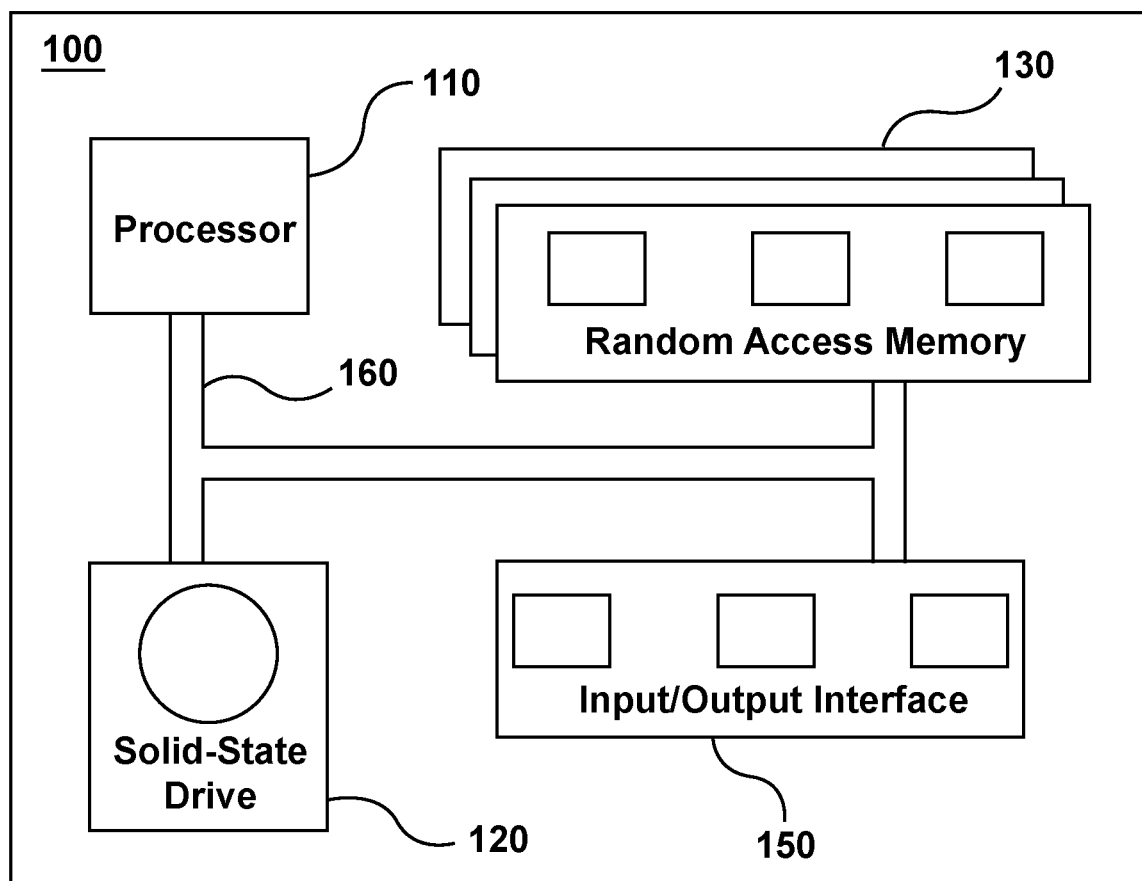
FIG. 9 is a schematic illustration of a computing environment of the system of FIG. 8 as implemented in accordance with at least some non-limiting embodiments of the present technology.

Turning first to the computer system 110, certain embodiments of the computer system 110 have a computing environment 140 as illustrated schematically in FIG. 9. The computing environment 140 comprises various hardware components including one or more single or multi-core processors collectively represented by a processor 150, a hard drive 160 in this case being a solid-state drive 160, a random access memory 170 and an input/output interface 180. Communication between the various components of the computing environment 140 may be enabled by one or more internal and/or external buses 190 (e.g. a PCI bus, universal serial bus, IEEE 1394 "Firewire" bus, SCSI bus, Serial-ATA bus, ARINC bus, etc.), to which the various hardware components are electronically coupled.

How the processor 150 is implemented is not particularly limited. However, broadly speaking, the processor 150 may be implemented as an electronic circuit configured to perform operations (e.g., processing) on some data provided thereto from a local and/or remote source, and typically, from a memory or some other data stream.

How the solid-state drive 160 is implemented is not particularly limited. However, broadly speaking, the solid-state drive 160 may be implemented as a solid-state storage device that uses integrated circuit assemblies as memory to persistently store data. Nevertheless, it is contemplated that other media used as memory to persistently store data, without departing from the scope of the present technology.

How the random access memory 170 is implemented is not particularly limiting. However, broadly speaking, the random access memory 170 may be implemented as a form of computer data storage that stores data and/or machine code (e.g., computer-readable instructions) that is being used by the computing environment 140. The random access memory 170 is arranged to store one or more of: set-up data, subject data, subject medical records of one or more subjects, digital anatomy representation data of the one or more of the subjects, and orthodontic treatment data. The orthodontic treatment data comprises, for example, material properties (e.g. chemical properties, mechanical properties, optical properties) of different materials for use in making aligners 22, number of treatment stages, information on the aligners 22 to be used in the treatment stages, durations of the treatment stages, desired total treatment duration, and the like. Other data relating to any type of orthodontic treatment or orthodontic appliance 10 can also be included in the random access memory 170. In some embodiments, the above-mentioned data may also be stored in the solid-state drive 160 in a manner that is suitable for being loaded into the random access memory 170.

How the input/output interface 180 is implemented is not particularly limiting. However, broadly speaking, the input/output interface 180 may be implemented so as to allow enabling networking capabilities, such as wire or wireless access, for example. As an example, the input/output interface 180 comprises a networking interface such as, but not limited to, a network port, a network socket, a network interface controller and the like. Multiple examples of how the networking interface may be implemented will become apparent to the person skilled in the art of the present technology. For example, but without being limiting, the networking interface may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

In accordance with at least some implementations of the computing environment 140, the solid-state drive 160 may be configured to store program instructions suitable for being loaded into the random access memory 170 and executed by the processor 150. For example, the program instructions may be part of a library and/or a software application that the computing environment 140 is configured to execute. In another example, as it will become apparent from the description herein below, the program instructions may be part of a software dedicated for simulating orthodontic treatments, which program instructions the computing environment 140 may be configured to execute.

In this embodiment, the computing environment 140 is implemented in a generic computer system which is a conventional computer (i.e. an "off the shelf" generic computer system). The generic computer system is a desktop computer/personal computer, but may also be any other type of electronic device such as, but not limited to, a laptop, a mobile device, a smart phone, a tablet device, or a server.

In other embodiments, the computing environment 140 is implemented in a device specifically dedicated to the implementation of the present technology. For example, the computing environment 140 is implemented in an electronic device such as, but not limited to, a desktop computer/personal computer, a laptop, a mobile device, a smart phone, a tablet device, a server, specifically designed for determining orthodontic treatments and orthodontic appliances. The electronic device may also be dedicated to operating other devices, such as one or more of the imaging device 120, and the manufacturing apparatus 130.

In some embodiments, the computer system 110 is connected to one or more of the imaging device 120, and the manufacturing apparatus 130. In some alternative embodiments, the computer system 110 or the computing environment 140 is implemented, at least partially, on one or more of the imaging device 120, and the manufacturing apparatus 130. In some alternative embodiments, the computer system 110 or the computing environment 140 may be hosted, at least partially, on a server. In some alternative embodiments, the computer system 110 or the computing environment 140 may be partially or totally virtualized through cloud architecture.

In some embodiments, the computing environment 140 is distributed amongst multiple systems, such as one or more of the imaging device 120, the manufacturing apparatus 130, the server, and cloud environment. In some embodiments, the computing environment 140 may be at least partially implemented in another system, as a sub-system for example. In some embodiments, the computer system 110 and the computing environment 140 may be geographically distributed.

Users of the computer system 110, in certain embodiments, are practitioners and staff of a given clinic. The computer system 110 may also be connected to clinical practice management software which could be used for subject appointment scheduling, inventory management (e.g., for managing stocks of precursor aligners) and other tasks based on the given orthodontic treatment and/or in view of other activities and needs of the clinic. It is also contemplated that the computer system 110 may also be arranged for being used remotely, such as by users of other clinics, for example via server or cloud environment.

As persons skilled in the art of the present technology may appreciate, multiple variations as to how the computer system 110 is implemented may be envisioned without departing from the scope of the present technology.

Interface Device of the Computer System

Referring back to FIG. 8, the computer system 110 has at least one interface device 200. Broadly speaking, the interface device 200 of the computer system 110 is configured for receiving inputs and/or providing outputs to the operator of the computer system 110. In the embodiment of FIG. 8, the interface device 200 includes a display 202 (such as a screen, for example) for providing a visual output to the operator of the computer system 100.

The visual output may include one or more images pertaining to the manufacturing of the orthodontic appliance 10, bending of the archwire 14, information relating to the orthodontic treatment including images of: the lower arch and/or the upper arch 24, a digital model of the lower arch and/or the upper arch 24 in a current teeth configuration, a digital model of the lower arch and/or the upper arch 24 in a desired teeth configuration, a digital model of a desired aligner 22. Other data related to the orthodontic treatment may also be included in the visual output, for example measurements (e.g., distances between anatomical landmarks, angulation between teeth), geometry (e.g., an occlusal plane) and identifiers (e.g., teeth site numbers, subject identifier). The visual output may also include visual data pertaining to operation to any one of the imaging device 120, and the manufacturing apparatus 130.

The interface device 200 may also comprise a keyboard 204 and/or a mouse 206 for receiving inputs from the operator of the computer system 110. The interface device 200 may include, in certain embodiments, other devices for providing an input to the computer system 110 such as, without limitation, a USB port, a microphone, a camera or the like. The interface device 200 may comprise a tablet, a mobile telephone, or any other electronic device.

In some embodiments, the interface device 200 may be configured to implement the computing environment 140 of FIG. 9 for processing inputs and/or outputs for the operator of the computer system 110. Put another way, the interface device 200 of the computer system 110 may comprise some or all components of the computing environment 140, without departing from the scope of the present technology. In some embodiments of the present technology, the interface device 200 implementing the computing environment 140 may be configured to execute software programs and/or applications for the purpose of aiding the operator of the computer system 110 during design of at least some components of the orthodontic appliance 10 or of the orthodontic treatment.

For instance, the interface device 200 may be configured to execute Computer-Aided Design (CAD) software. Broadly speaking, CAD software is typically used for increasing the productivity of the operator during the design process, improving the quality of the design itself, and generating digital models for manufacturing purposes. For instance, when executed by the interface device 200, the CAD software may be used by the operator of the computer system 110 for inter alia importing/exporting 3D models, designing curves, surfaces, and/or solids in a 3D virtual environment, and the like.

It is contemplated that the interface device 200 may be configured to execute any 3D graphics software that aids the operator of the computer system 110 during design of the at least some components of the orthodontic appliance 10 or the orthodontic treatment.

In other embodiments of the present technology, the interface device 200 implementing the computing environment 140 may be configured to execute software programs and/or applications for the purpose of generating 3D representations of the at least some components of the orthodontic appliance 10 in an automatic and/or semi-automatic manner (e.g., with little or no intervention of the operator). For instance, such software programs and/or applications may be configured to acquire information representative of at least a portion of the oral region of the subject and, based on that information, automatically and/or semi-automatically generate 3D representations of the at least some components of the orthodontic appliance 10. In at least some embodiments of the present technology, such software programs and/or applications may be employed by the computer system 110 for execution of at least some computer-implemented methods disclosed herein.

Communication Network

As mentioned above, the system 100 may also comprise the communication network 135. In some embodiments of the present technology, the communication network 135 is the Internet. In alternative non-limiting embodiments, the communication network can be implemented as any suitable local area network (LAN), wide area network (WAN), a private communication network or the like. It should be expressly understood that implementations for the communication network are for illustration purposes only.

The communication network 135 may provide a communication link (not separately numbered) between one or more of the computer system 110 and the imaging device 120, the manufacturing apparatus 130, and the interface device 200. How the communication network 135 is implemented will depend inter alia on how the computer system 110, the imaging device 120, the manufacturing apparatus 130, and the interface device 200 are implemented. Merely as an example and not as a limitation, in those embodiments of the present technology where the computer system 110 is implemented as a wireless communication device such as a smartphone or a tablet, the communication link can be implemented as a wireless communication link. Examples of wireless communication links include, but are not limited to, a 3G communication network link, a 4G communication network link, and the like.

In some embodiments of the present technology, the communication network 135 may allow the computer system 110 to provide and/or acquire information from external/remote computer systems. For example, the communication network 135 may communicatively couple the computer system 110 with computer systems of other operators and/or of other entities, such as orthodontic clinics.

Imaging Device

As mentioned above, in certain embodiments, the system also comprises the imaging device 120. Broadly speaking, the imaging device 120 may be implemented as any imaging system that is configured to capture and/or process images of a subject's oral region. In some embodiments, it is contemplated that the imaging device 120 may be configured to capture and/or process images of teeth 16 and/or surrounding tissues of the subject's mouth. For instance, the information representative of at least a portion of the oral region of the subject may be composed, at least partially, of the images captured and/or processed by the imaging device 120.

In some embodiments, the images captured and/or processed by the imaging device 120 may include, but are not limited to: images of crown portions of teeth 16 (internal and/or external), images of root portions of teeth (internal and/or external), images of tissues surrounding the teeth, images of nerve pathways in the teeth and/or in the surrounding tissues, images of bones such as jaw bones, other images of the oral region, and the like.

In certain embodiments, the image data received from such devices is indicative of properties of anatomical structures of the subject, including: teeth, intraoral mucosa, maxilla, mandible, temporomandibular joint, and nerve pathways, among other structures. In some embodiments, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some embodiments, the image data includes cephalometric image datasets. In some embodiments, the image data includes datasets generally intended for the practice of endodontics. In some embodiments, the image data includes datasets generally intended for the practice of periodontics.

It should be noted that images captured and/or processed by the imaging device 120 may be in 2D and/or 3D. For example, the images captured and/or processed by the imaging device 120 may be, but are not limited to: computed tomography (CT) images, x-ray images, digitalized 3D physical model images, magnetic resonance images, nuclear medicine images, photographic images, and the like. Any type of image format visualizing the tooth and/or the surrounding areas may be potentially acceptable within the context of the present technology.

In some embodiments of the present technology, the imaging device 120 may be implemented as an intra-oral scanner for providing 3D digital models of the teeth 16 of the subject (e.g., 3D representations of the teeth 16 of the subject). Typically, intra-oral scanners have a component that (i) can be received in the oral region, (ii) has a light source for providing light to the oral region requiring imaging, and (iii) has an imaging sensor for capturing images of the oral region. It is contemplated that the intra-oral scanner may comprise an internal computer system that can (i) receive the captured images and (ii) generate digital 3D surface models (for example, in a "mesh" form) of the oral region. This technique provides an alternative to making traditional plaster models of the oral region followed by their digital imaging.

In other embodiments of the present technology, the imaging device 120 may be implemented as a Computed Tomography (CT) scanner for providing CT scan images. Typically, CT scan images are 3D images and provide x-ray level detail of the teeth, soft tissues, nerve pathways and bone. Optionally, other types of CT scanners can be used to provide panoramic, cephalometric or cone beam projections, without departing from the scope of the present technology.

In further embodiments of the present technology, the imaging device 120 may be implemented as any one of or any combination of: an x-ray apparatus for providing x-ray 2D images of the oral region, a magnetic resonance imaging device for providing magnetic resonance images, an ultrasound apparatus for providing ultrasound images of the oral region, and the like. Irrespective of the particular implementation of the imaging device 120, it is contemplated that the imaging device 120 may comprise at least one hardware processor for processing the images and at least one memory component for storing the images.

Alternatively, as contemplated in other embodiments, the imaging device 120 may be a camera for indirect digitization of intraoral anatomy via a replica (i.e., a dental model). In some such embodiments, the replica is obtainable via a dental impression (i.e., a negative mold) made of a material (such as polyvinyl-siloxane) having been imprinted with the shape of the intraoral anatomy it has been applied to. Alternatively, in other embodiments, the digital surface model may be generated via digitizing the dental impression.

The format in which the 3D image is generated by the imaging device 120 and/or acquired by the computer system is not particularly limited. However, as an example, the 3D image may be generated by the imaging device and/or acquired by the computer system in STL format and/or OBJ format.

In the context of the present technology, it is contemplated that the 3D image is a 3D representation of the at least the portion of the oral region of the subject. It can thus be said that the 3D image is a 3D object representative of the at least the portion of the oral region of the subject.

Manufacturing Apparatus

As mentioned above, in certain embodiments the system 100 also comprises the manufacturing apparatus 130. Broadly speaking, the manufacturing apparatus 130 comprises any manufacturing system that may be configured to manufacture at least some components of the orthodontic appliance 10. For instance, the manufacturing apparatus 130 may be configured to inter alia (i) acquire data indicative of instructions for manufacturing the at least some components of the orthodontic appliance 10, and (ii) execute those instructions for manufacturing the at least some components of the orthodontic appliance 10.

The manufacturing apparatus 130 may be configured to manufacture a variety of components of the orthodontic appliance 10 such as, but not limited to: platforms, brackets 12, archwires 14, aligners 22, trainers, retainers, mouthguards, and/or any other type of orthodontic appliance 10.

In some embodiments, where the manufacturing apparatus 130 is configured to manufacture brackets 12 of a bracket/archwire system 10*a*, the manufacturing apparatus 130 may include, but is not limited to: a casting apparatus, a molding apparatus, an additive manufacturing apparatus (e.g., 3D printing apparatus), a melting apparatus, and the like.

In other embodiments, where the manufacturing apparatus 130 is configured to manufacture archwires 14, the manufacturing apparatus 130 may include, but is not limited to: a robotic bending apparatus, a heating/cooling apparatus, a smart material manufacturing apparatus, and the like.

In further embodiments, where the manufacturing apparatus is configured to manufacture aligners 22, trainers, retainers and/or mouth-guards, the manufacturing apparatus may include, but is not limited to: a thermoforming apparatus, a molding apparatus, an additive manufacturing apparatus (e.g., 3D printer), and the like.

It is contemplated that the system 100 may also include a combination of various types of manufacturing apparatuses 130 for manufacturing a various types of components of the orthodontic appliance 10, without departing from the scope of the present technology.

Figure 10:
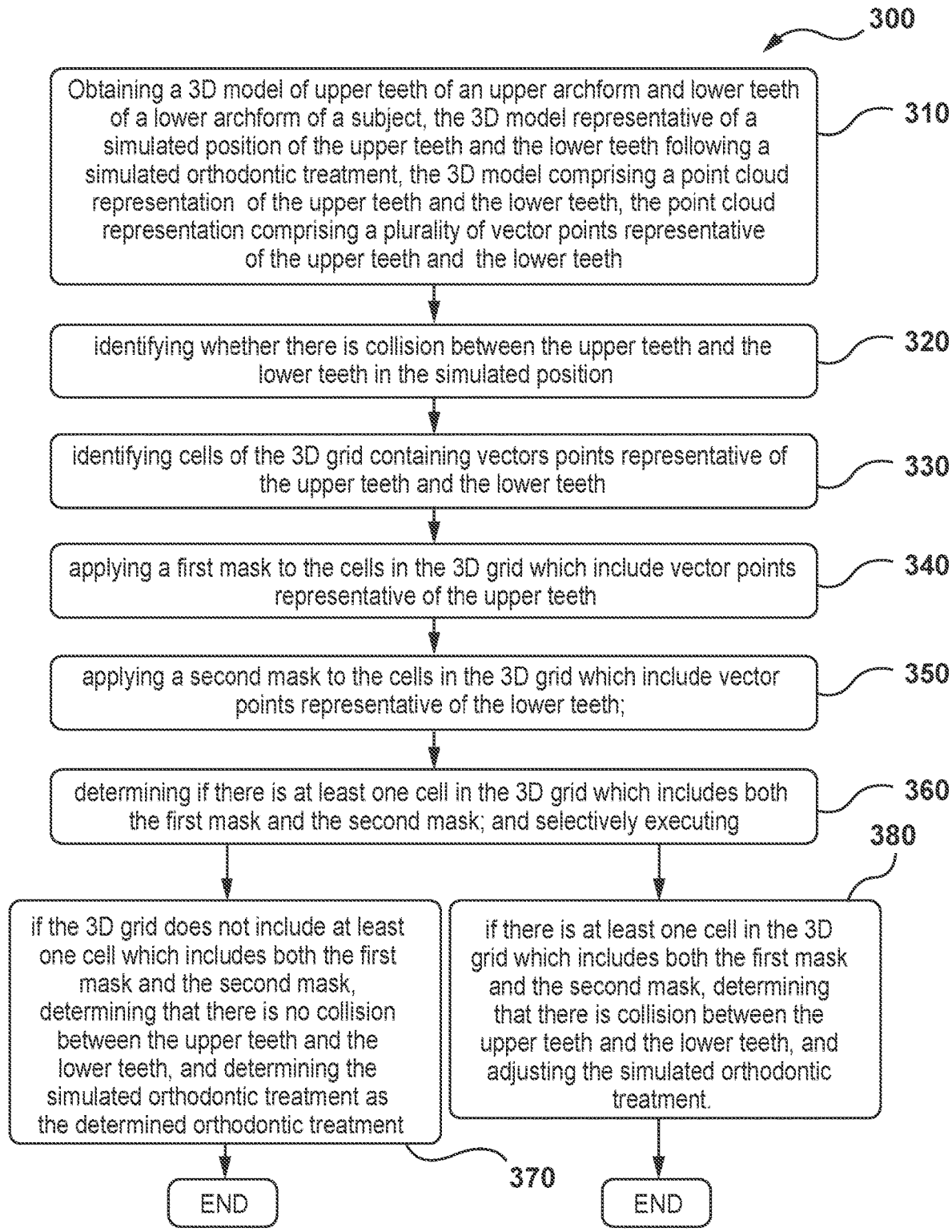
FIG. 10 is a schematic illustration of a method of determining an orthodontic treatment for a subject executable by the computing environment of FIG. 9, in accordance with at least some embodiments of the present technology.

In some embodiments of the present technology, the computer system 110 (i.e. the processor thereof) is configured to perform a method 300 for determining or optimizing an orthodontic treatment for the subject (FIG. 10). More specifically, in certain embodiments, the processor 150 of the computer system 110 is configured to determine whether there is a collision between opposing teeth 16 of the lower arch and the upper arch 24 of the subject, and to optimize a proposed orthodontic treatment based on the determined collision. By collision is meant malocclusion or improper bite in certain embodiments.

STEP 310: obtaining a 3D model of upper teeth of an upper archform and lower teeth of a lower archform of a subject, the 3D model representative of a simulated position of the upper teeth and the lower teeth following a simulated orthodontic treatment, the 3D model comprising a point cloud representation of the upper teeth and the lower teeth, the point cloud representation comprising a plurality of vector points representative of the upper teeth and the lower teeth.

Figure 11A:
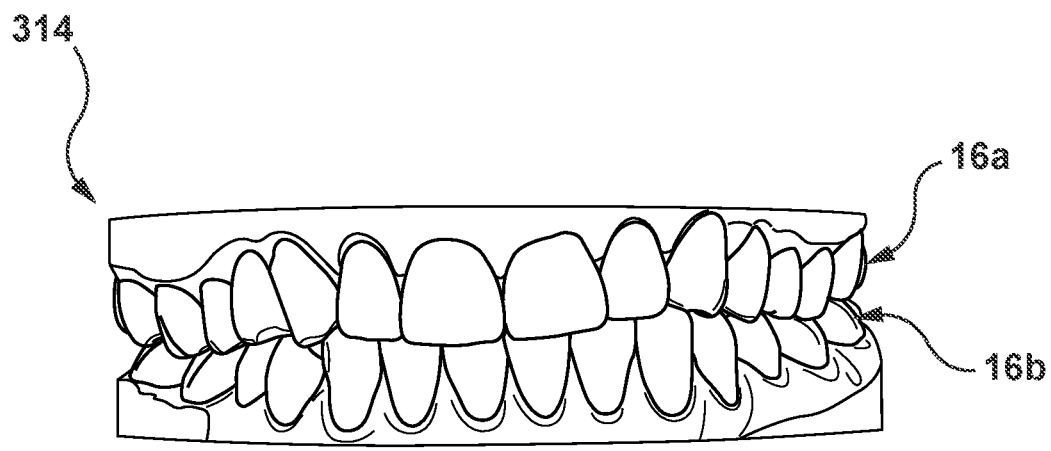
FIGS. 11A and 11B are front view and side view, respectively, of an example image of teeth to be used in the method of FIG. 10, in accordance with at least some embodiments of the present technology.
Figures 12A, 12B:
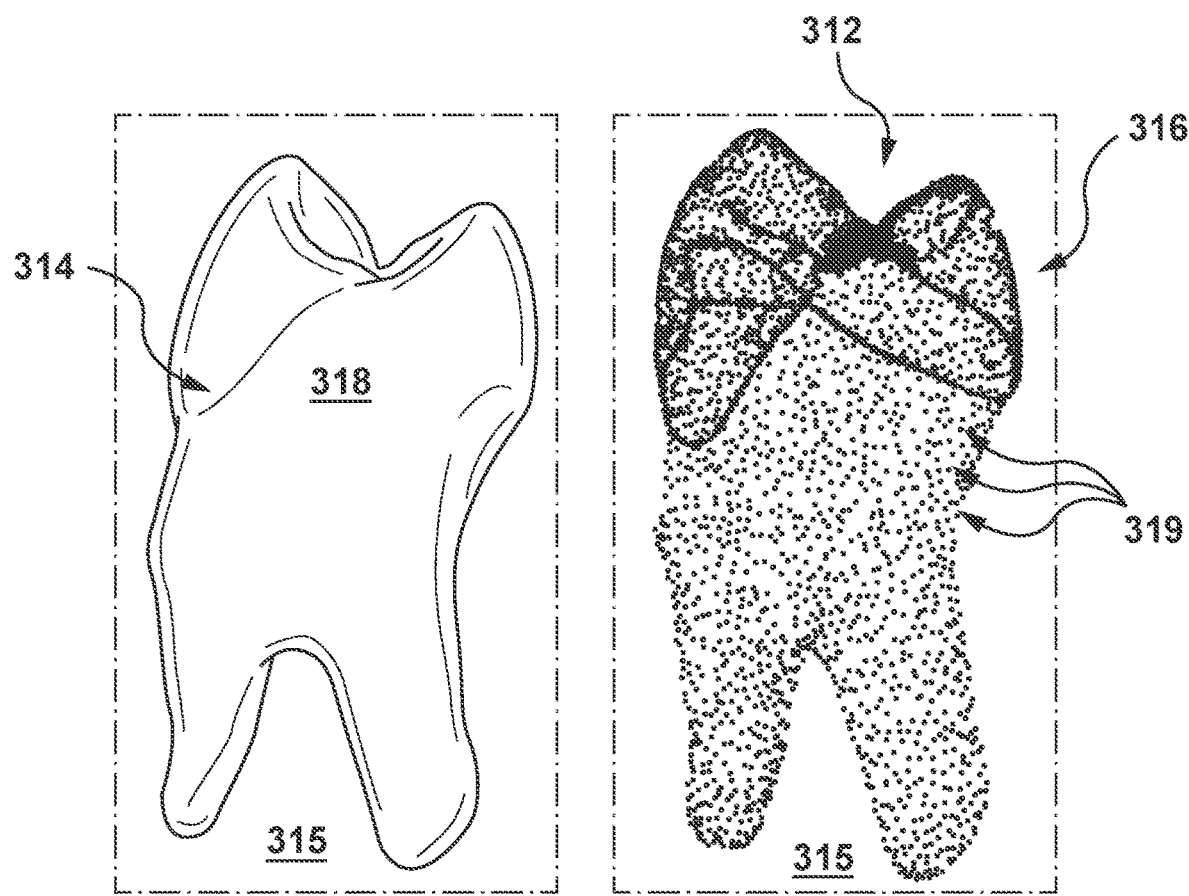
FIG. 12A is an example image of a tooth to be used in the method of FIG. 10, in accordance with at least some embodiments of the present technology.
FIG. 12B is a 3D model of the tooth of FIG. 12A to be used in the method of FIG. 10, in accordance with at least some embodiments of the present technology derived from the image.

Step 310 of the method 300 comprises the processor 150 acquiring a 3D model 312 of the plurality of teeth 16. In certain embodiments, the plurality of teeth 16 comprise upper teeth 16a of an upper archform 302 and lower teeth 16b of a lower archform 304 (FIGS. 11A and B). An image of a single tooth 16 of the plurality of teeth is shown in FIG. 12A, and the 3D model of the single tooth of FIG. 12A is illustrated in FIG. 12B. The 3D model of FIG. 12B being a portion of the 3D model 312 of the plurality of teeth. The 3D model 312 of the teeth 16 may be representative of a proposed orthodontic treatment for the plurality of teeth 16, and may include information relating to one or more of: the initial position 42 of one or more teeth 16 of the plurality of teeth 16, the desired position 44 of one or more teeth 16 of the plurality of teeth 16, and the trajectory 46 defining the path of movement of one or more teeth 16 of the plurality of teeth 16 to move from the initial position 42 to the desired position 44. Embodiments of the method 300 will be described below in relation to one tooth 16 of the plurality of teeth 16 ("the given tooth 16"), but it will be understood that embodiments of the method 300 can also apply to more than one tooth 16 of the upper teeth 16a and lower teeth 16b of the subject.

Information Relating to the Initial Position 42, the Desired Position 44, and the Trajectory 46

The initial position 42 of the tooth 16 of the subject can be obtained in any known manner, such as through software in which the initial position 42 of the tooth 16 is identified using the imaging device 120, and a 3D digital model 312 of the tooth 16 created therefrom. FIGS. 11A and B illustrate an image 314 of the upper teeth 16a and the lower teeth 16b in the upper and lower archforms 302, 304, respectively, in the initial position 42 in one example, as acquired by the intra-oral scanner as the imaging device 120.

In certain embodiments, the 3D model 312 representative of the proposed orthodontic treatment includes information relating to the initial position 42 of the tooth 16. The information relating to the initial position 42 may comprise a vector or a coordinate defining the initial position 42 of the tooth 16, which may be relative to at least one other tooth 16 of the plurality of teeth 16 or to a reference point.

In this respect, the method 300 may further comprise the processor 150 determining the initial position 42 of the tooth 16 by obtaining an image of the tooth 16, and determining a 3D model of the tooth 16 from the image 314 of the tooth 16. The method 300 may further comprise the processor 150 obtaining a 3D model of the tooth 16 representative of the initial position 42 of the tooth 16.

In certain embodiments, the 3D model 312 representative of the proposed orthodontic treatment also includes information relating to the desired position 44 of the tooth 16. The information relating to the desired position 44 of the tooth 16 may comprise a vector or a coordinate defining a desired position 44 of the tooth 16 of the plurality of teeth 16, which may be relative to at least one other tooth 16 of the plurality of teeth 16 or to a reference point.

The desired position 44 may have been determined in any suitable manner. In certain embodiments, the desired position 44 may have been determined by the processor 150 of the computer system 110, or by another computer system, such as by manipulating a 3D model derived from the image of the teeth 16 showing the initial position 42 of the tooth 16. In this respect, the method 300 may further comprise the processor 150 determining the desired position 44 of the given tooth 16 by parsing the image of the tooth 16 or a 3D model of the tooth 16. The method 300 may further comprise obtaining a 3D model of the tooth 16, and optionally parsing the 3D model 312 of the tooth 16 to determine the desired position 44 of the tooth 16.

In other embodiments, the desired position 44 of the tooth 16 may be determined manually, such as using a physical model, such as a plaster model, of the initial position 42 of the tooth 16. In these embodiments, the physical model may be digitized to create a 3D model of the desired position 44 of the tooth 16.

In certain embodiments, the 3D model 312 representative of the simulated orthodontic treatment includes information relating to the trajectory 46 defining the path of movement of the tooth 16 of the plurality of teeth 16 from the initial position 42 to the desired position 44.

The trajectory 46 may be a direct path between the initial position 42 and the desired position 44. The trajectory 46 is defined, in certain embodiments, by a distance of movement and a direction of movement. The direction of movement may be defined relative to x, y, z planes in a simulation space 315.

In certain embodiments, the method 300 comprises the processor 150 determining the trajectory 46 based on the initial position 42 and the desired position 44 of the tooth 16. Alternatively, the method 300 comprises acquiring the trajectory 46 as an input from the user or from another source.

It will be appreciated that the trajectory 46 is representative of a proposed trajectory 46. Embodiments of the method 300, in later steps, will serve to either validate the proposed trajectory 46 and thus the proposed orthodontic treatment (thereby determining the proposed orthodontic treatment as the determined orthodontic treatment), or to adjust the proposed trajectory 46 and thus the proposed orthodontic treatment (thereby determining the adjusted orthodontic treatment as the determined orthodontic treatment).

3D Model

Referring now to FIGS. 12A and 12B, the 3D model 312 of the upper teeth 16a and the lower teeth 16b comprises a point cloud representation 316 of the upper teeth 16a and the lower teeth 16b, and more specifically, a point cloud representation 316 of a surface 318 of the upper teeth 16a and the lower teeth 16b (the surface 318 of the given tooth 16 can be seen in FIG. 12A). The point cloud representation of the upper teeth 16a and the lower teeth 16b comprises a set of data points in the simulation space 315, the data points being vector points 319 (such as x, y and z coordinates). As seen in FIG. 12B, the vector points 319 are spaced from one another in a manner known in the art. They may be spaced regularly or irregularly. Point cloud representation differs from that of conventional 3D models of teeth, such as triangular meshes, in that they include only the information about the vertices but not the surface triangles. In at least some non-limiting embodiments of the present technology, use of point cloud representation can reduce computational processing requirements.

Figure 13:
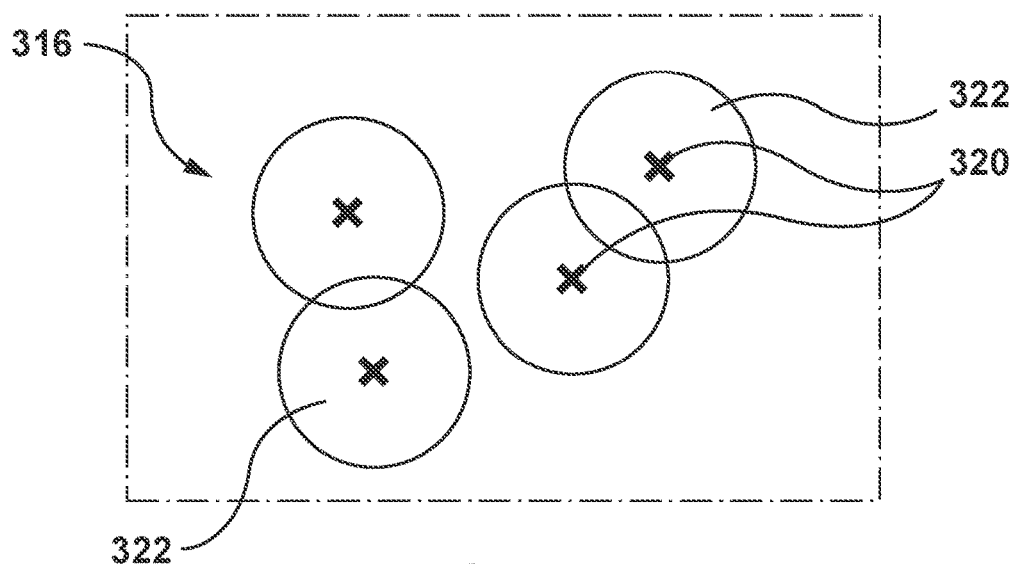
FIG. 13 is a schematic illustration of a portion of the 3D model of FIG. 12B comprising a point cloud representation, in accordance with at least some embodiments of the present technology derived from the image.

In certain embodiments, the 3D model 312 of the upper teeth 16a and the lower teeth 16b comprises a plurality of vector spheres 322 (FIG. 13). Each vector sphere 322 comprises a sphere 324 centered at a vector point, such as the vector point 319 of FIG. 12B. The spheres 324 have predetermined diameters (FIG. 13). In this respect, the method 300 further comprises, in certain embodiments, transforming each vector point 319 of the plurality of vector points 319 into a vector sphere 322, the vector sphere 322 comprising the sphere 324 with the predetermined diameter and centered at each vector point 319.

Developers have noted that detection of collision or malocclusion between the upper teeth 16a and the lower teeth 16b (which will be described below) is facilitated when the 3D model 312 is represented by the plurality of vector spheres 322 as distances between the vector spheres 322 are more easily determined as opposed to distances between ideal mathematical points with infinitely small radii.

In certain embodiments, the point cloud representation 316 of the upper teeth 16a and the lower teeth 16b is obtained by converting another type of model of the upper teeth 16a and the lower teeth 16b, such as a triangular mesh 3D model, to the point cloud representation 316.

Figure 11B:
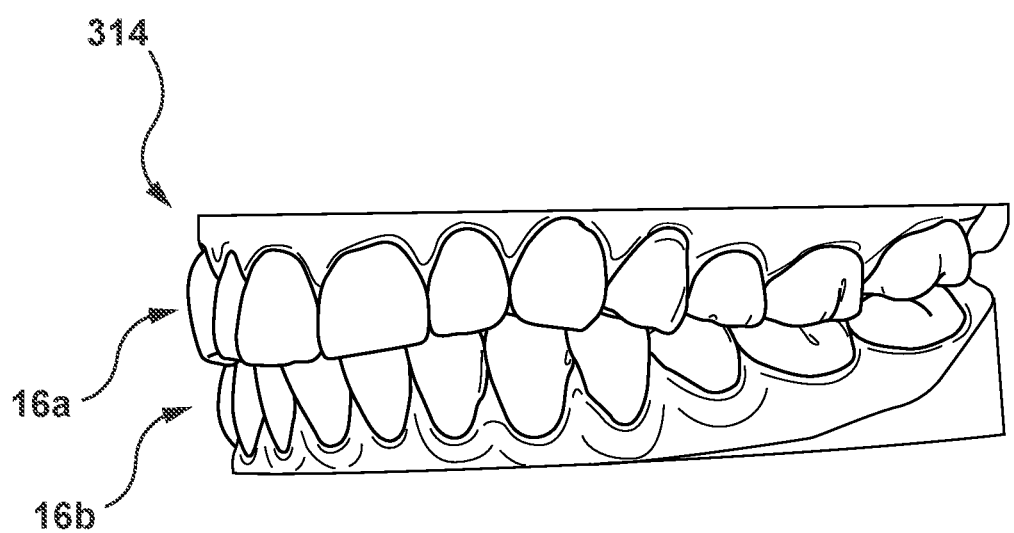

In certain embodiments, the point cloud representation 316 of the upper teeth 16a and the lower teeth 16b is obtained by converting a digital image of the upper teeth 16a and the lower teeth 16b, such as the image 314 in FIGS. 11 and 12A, to the point cloud representation 316.

In certain embodiments, the method 300 comprises obtaining the 3D model 312 of the upper teeth 16a and the lower teeth 16b based on image data of the upper teeth 16a and the lower teeth 16b, and parsing the image data of the upper teeth 16a and the lower teeth 16b or the 3D model 312 of the upper teeth 16a and the lower teeth 16b to segment each tooth 16 of the upper teeth 16a and the lower teeth 16b, in order to allow independent manipulation of each tooth 16. In certain embodiments, the segmentation may also comprise separating the teeth 16 from soft tissue surrounding the teeth 16.

Figure 14:
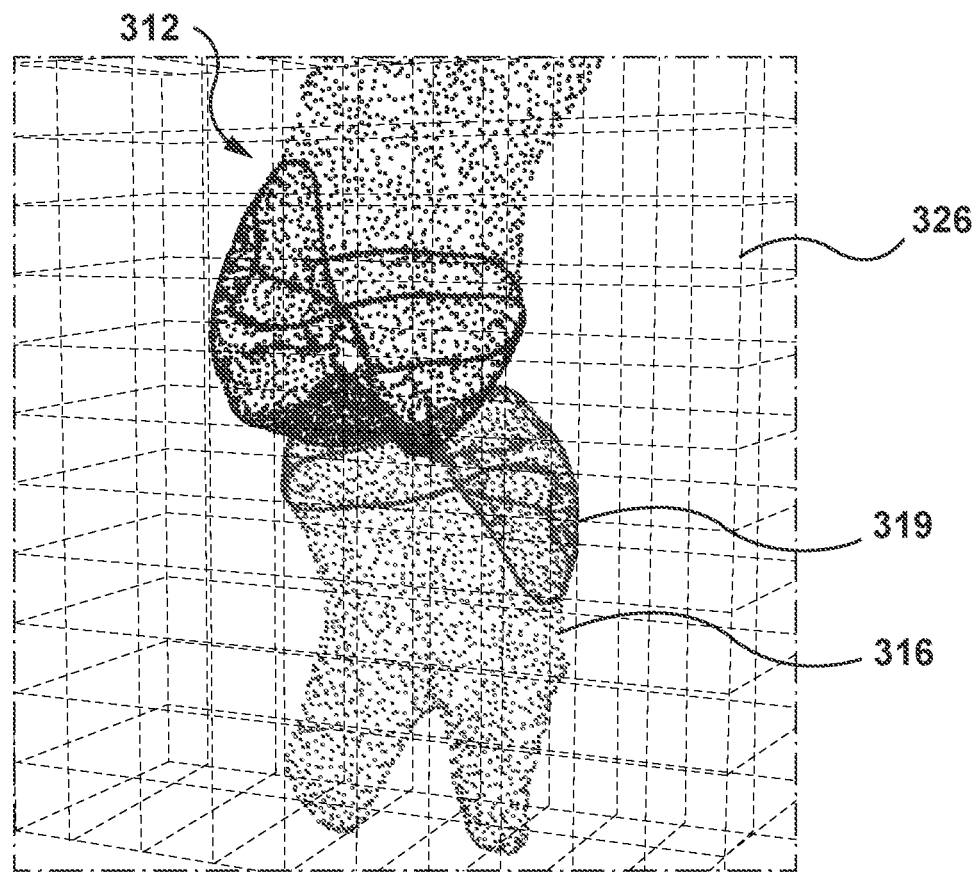
FIG. 14 is a schematic illustration of a 3D model of two opposing teeth positioned in a 3D grid of simulation space, to be used in the method of FIG. 10, in accordance with at least some embodiments of the present technology.

STEP 320: identifying whether there is collision between the upper teeth and the lower teeth in the simulated position The method 300 continues with Step 320 in which the processor 150 detects whether there is collision between the upper teeth 16a and the lower teeth 16b in the simulated position. This is performed using a 3D grid 326 in a simulation space 328 onto which the plurality of the vector points 319 representative of the upper teeth 16a and the lower teeth 16b have been mapped (FIG. 14). The method 300 may further comprise mapping the vector points 319 representative of the upper teeth 16a and the lower teeth 16b onto the 3D grid 326.

The identification of the collision between the upper teeth 16a and the lower teeth 16b is performed, in certain embodiments, by steps 330, 340, 350 and 360 of the method 300.

Figure 15:
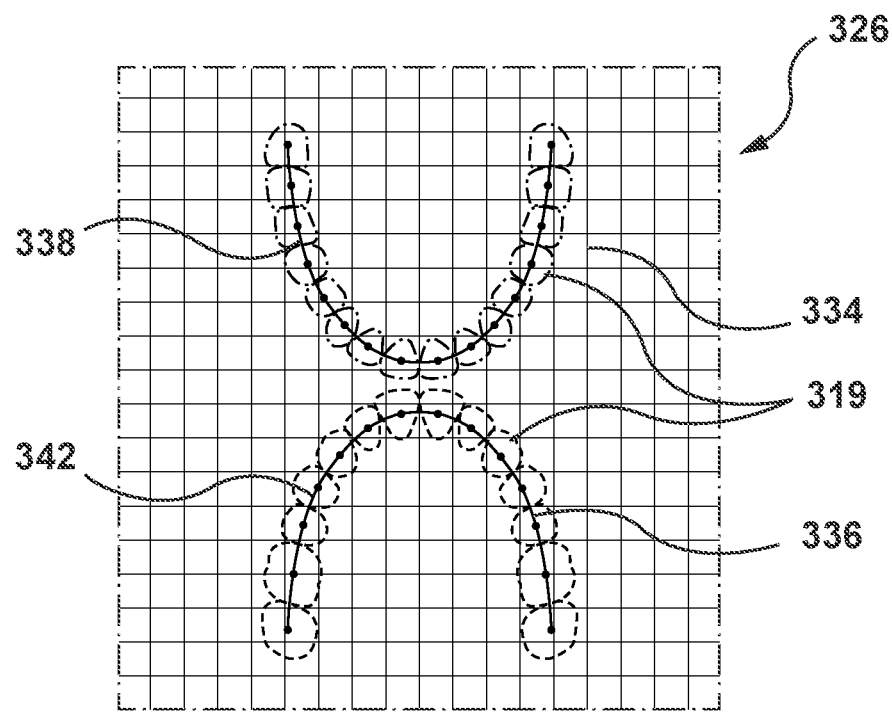
FIG. 15 is a schematic illustration of the 3D model of the two opposing teeth of FIG. 14 with cell masking, in accordance with at least some embodiments of the present technology.

STEP 330: identifying cells of the 3D grid containing vectors points representative of the upper teeth; and identifying cells of the 3D grid containing vectors points representative of the lower teeth Referring to FIG. 15, in Step 330, the method 300 comprises identifying cells 332 of the 3D grid 326 containing vectors points 319 representative of the upper teeth 16a (also referred to as "upper teeth cells 334"), and identifying cells 332 of the 3D grid 326 containing vector points 319 representative of the lower teeth 16b (also referred to as "lower teeth cells 336").

In step 340, the method 300 comprises applying a first mask 338 to the upper teeth cells 332 (i.e. those cells 332 in the 3D grid 326 which include vector points 319 representative of the upper teeth) (also referred to as "masked upper teeth cells"). In step 350, the method 300 comprises applying a second mask 342 to the lower teeth cells 332 (i.e. those cells 332 in the 3D grid 326 which include vector points 319 representative of the lower teeth 16b) (also referred to as "masked lower teeth cells"). The first mask 338 and the second mask 342 can be considered as identifiers or markers of cells 332 containing vector points 319 associated with the upper 16a and the lower teeth 16, respectively. The first and second masks 338, 342 can take any suitable form.

In step 350, the method 300 comprises determining if there is at least one cell 332 of the 3D grid 326 which includes both the first mask 338 and the second mask 342. In other words, it is determined whether any of the masked upper teeth cells and the masked lower teeth cells are the same cell.

STEP 360: if the 3D grid does not include at least one cell which includes both the first mask and the second mask, determining that there is no collision between the upper teeth and the lower teeth, and determining the simulated orthodontic treatment as the determined orthodontic treatment, if there is at least one cell in the 3D grid which includes both the first mask and the second mask, determining that there is collision between the upper teeth and the lower teeth, and adjusting the simulated orthodontic treatment.

The method 300 then comprises determining whether there is collision between the upper teeth 16a and the lower teeth 16b by identifying if the 3D grid 326 includes at least one cell 332 which includes both the first mask 338 and the second mask 242. In other words, the method 300 comprises determining that there is collision between the upper teeth 16a and the lower teeth 16b if at least one cell 332 is determined to be both a masked upper teeth cell 332 and a masked lower teeth cell 332. If there is no cell 332 of the 3D grid 326 that includes the first mask 338 and the second mask 342, the method 300 determines that there is no collision of the upper teeth 16a and the lower teeth 16b, and the simulated orthodontic treatment is determined as the determined orthodontic treatment. If the method 300 determines that there is collision between the upper teeth 16a and the lower teeth 16b, the method 300 determines that adjustment of the simulated orthodontic treatment is required.

Adjusting the Orthodontic Treatment

In certain embodiments, the adjusting the simulated orthodontic treatment comprises adjusting the trajectory 46 of movement of the tooth 16 from the initial position 42 to the desired position. The adjustment is made to avoid collision between the upper teeth 16a and the lower teeth 16b during the proposed orthodontic treatment, or to keep the extent of collision within a predetermined limit. In certain embodiments, the predetermined limit may be defined as contact between the upper teeth 16a and the lower teeth 16b that does not cause a malocclusion or bad bite.

Figure 16A:
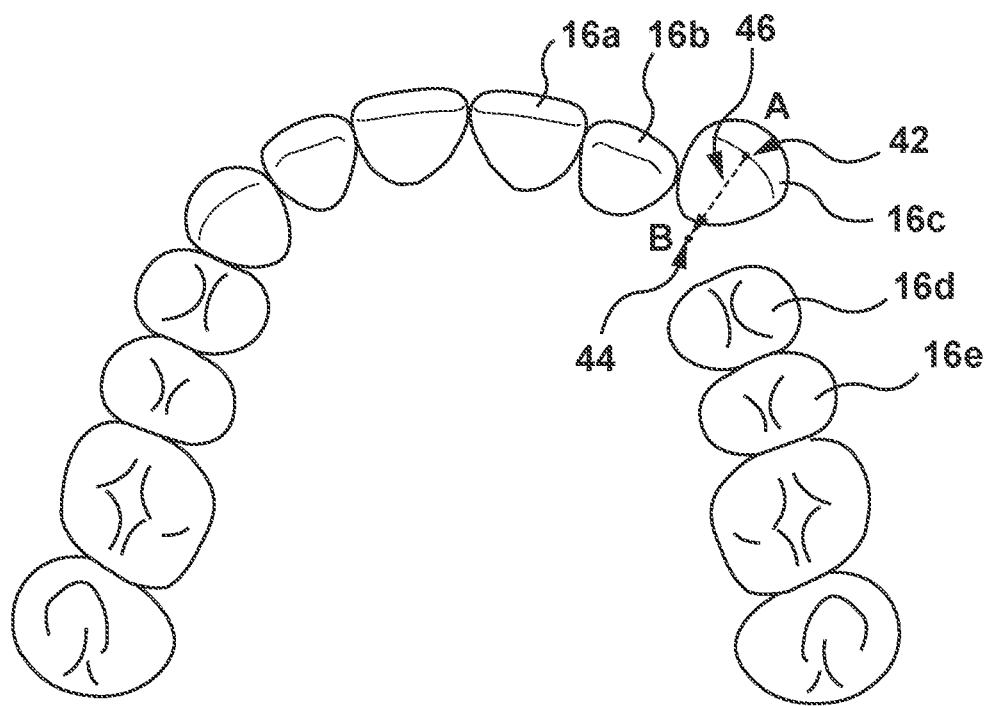
FIGS. 16A, 16B and 16C are schematic illustrations of the teeth of FIG. 7 showing a proposed orthodontic treatment, a collision event, and an adjusted orthodontic treatment after collision detection, respectively, in accordance with at least some embodiments of the present technology.
Figure 16B:
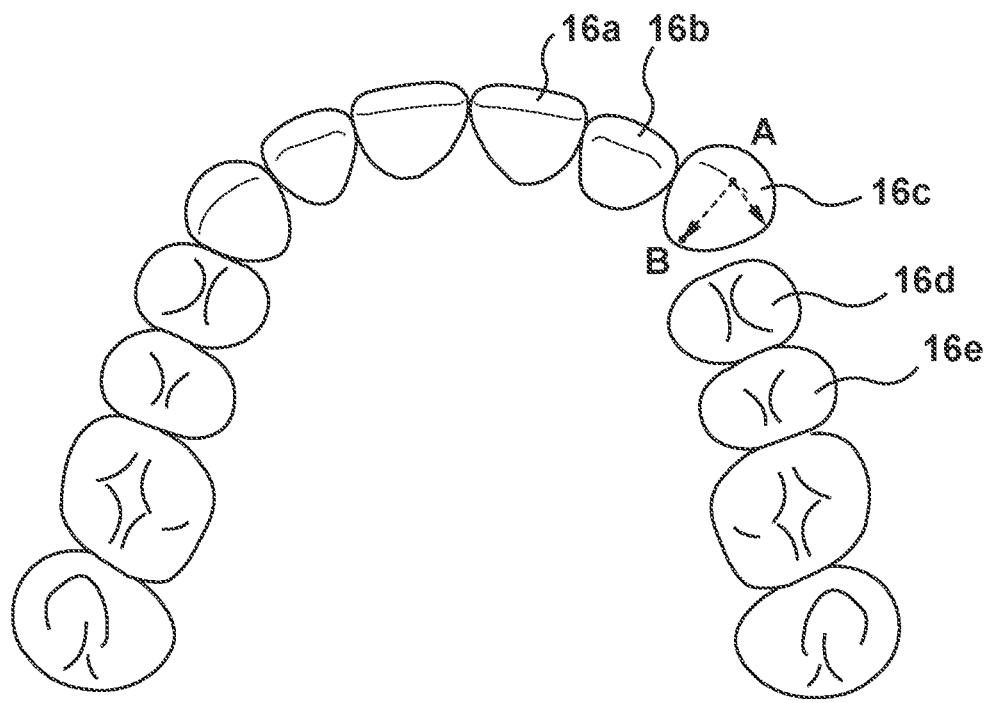
Figure 16C:
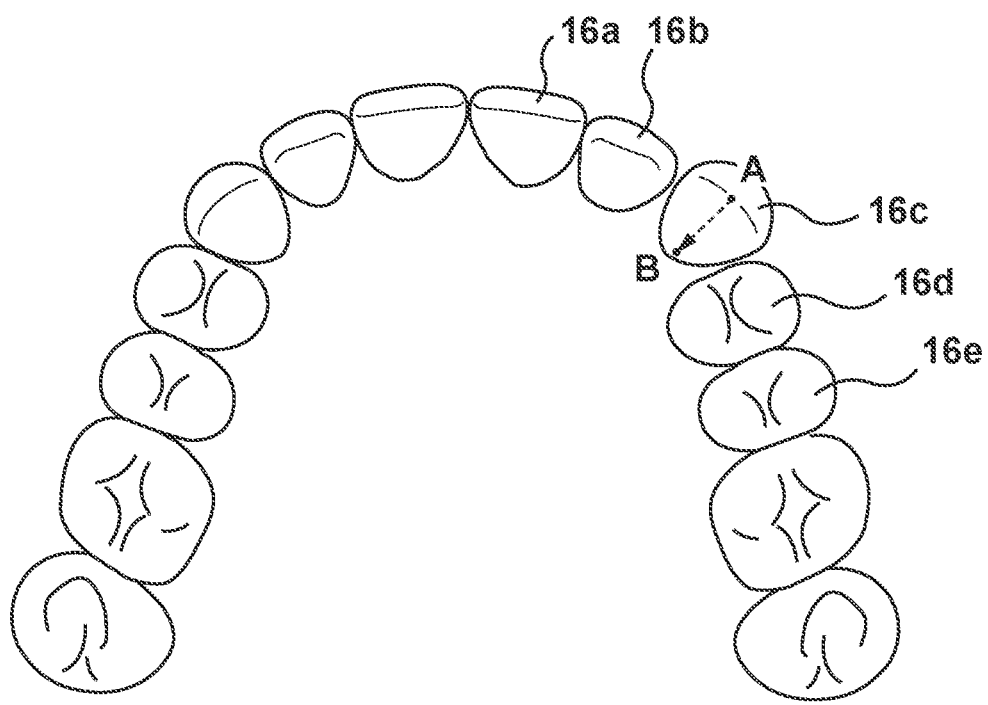

An example of such an adjustment is illustrated in FIGS. 16A-16C. In FIG. 16A, the proposed orthodontic treatment for the tooth 16c is illustrated by trajectory 46 defining a direct path from the initial position 42 to the desired position of the tooth 16c. As mentioned earlier, the trajectory 46 is defined in terms of the direction of movement and the distance of movement (magnitude of movement). The proposed orthodontic treatment may result in a predicted collision event (FIG. 16B). One example of an adjustment to the trajectory 46 is illustrated in FIG. 16C, in which instead of the trajectory 46 in a single direction, the tooth 16c is moved in a first direction (e.g. along the x-axis plane) for a first distance past tooth 16b, before being moved in a second direction for a second distance (e.g. along the y-axis plane towards the desired position 44), thereby avoiding collision with the tooth 16b.

Another example of the adjusting the simulated orthodontic treatment comprises adjusting a separation of the upper archform 302 and the lower archform 304. For example, if collision between any one of the upper teeth 16a and any one of the lower teeth 16b is detected, the method 300 comprises adapting the orthodontic treatment such that the lower archform 304 is moved away from the upper archform 302, with the upper archform 302 being kept stationary. For each adjusted position, the method 300 is repeated to determine whether there is any collision between the upper teeth 302 and the lower teeth 304, until it is determined that there is no collision between the upper teeth 302 and the lower teeth 304.

In other embodiments, the adjusting the simulated orthodontic treatment comprises adapting the orthodontic treatment such that the upper archform 302 is moved away from the lower archform 304, with the lower archform 304 being kept stationary.

In yet further embodiments, the upper archform 302 and the lower archform 304 are both moved.

In certain embodiments, the method 300 further comprises executing a simulation of the movement of the teeth 16 according to the adjusted orthodontic treatment, to obtain an adjusted 3D model of the teeth 16. In the example illustrated in FIG. 16B, the simulation of the movement of the teeth 16 according to the adjusted orthodontic treatment comprises movement of the tooth 16c in the first direction for the first distance and in the second direction for the second distance.

In certain embodiments, the adjusted simulated movement is representative of one or more of: a different direction of movement, and a different distance of movement compared to the proposed orthodontic treatment.

In certain embodiments, the method 300 further comprises identifying a magnitude of collision of the upper teeth 16a and the lower teeth 16b, and determining the adjusted simulated movement by an amount proportional to the identified magnitude of collision. The amount may be 50% of the identified magnitude of collision. In certain embodiments, the adjusted simulated movement is representative of a shorter distance of movement of the plurality of teeth 16 to the adjusted simulated position.

In certain embodiments, the adjusted simulated movement comprises an iterative movement of one or both of the upper archform 302 and the lower archform 304 away from one another, until there is not further collision determined between the upper teeth 16a and the lower teeth 16b.

The method 300 may further comprise iteratively executing at least one or more of: Steps 310, 320, 330, 340, 350 and 360 for the positions represented in the adjusted simulated movement until it is determined that there is no collision between any of the upper teeth 16a and the lower teeth 16b.

In certain embodiments, the iterative execution comprises updating the point cloud representation 316 of the plurality of teeth 16 with an adjusted position of the plurality of teeth 16 following the adjusted simulated orthodontic treatment, and determining whether there is collision or not between opposing teeth 16 of the upper and lower archforms 302, 304, until it is determined that there is no collision between the teeth 16.

In certain embodiments, when there is no collision detected, one or both of the upper archform 302 and the lower archform 304 are brought towards one another, and the method 300 repeated until a collision is detected. This can help to determine an optimal spacing of the upper archform 302 and the lower archform 304 from another.

False Negatives or False Positives

In certain embodiments, the method 300 further comprises detecting one or more of false positives and false negatives. For example, grid resolution is controlled such that the grid cells 332 are kept at about 10-50 microns.

In certain embodiments, false positives and false negatives are avoided or reduced by providing cells having a size in which dead zones between cells are negligible.

Display Output

Figure 17A:
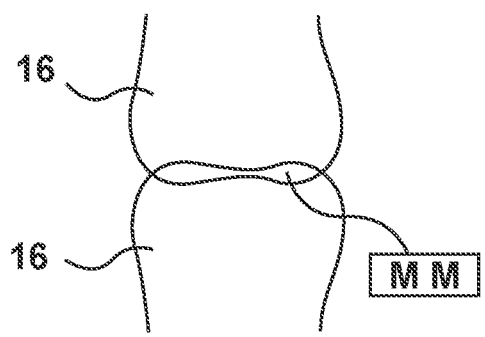
FIGS. 17A and 17B are schematic illustrations of different embodiments of a display of the determined collision between (A) two opposing teeth, and (B) a plurality of teeth, in accordance with at least some other embodiments of the present technology.
Figure 17B:
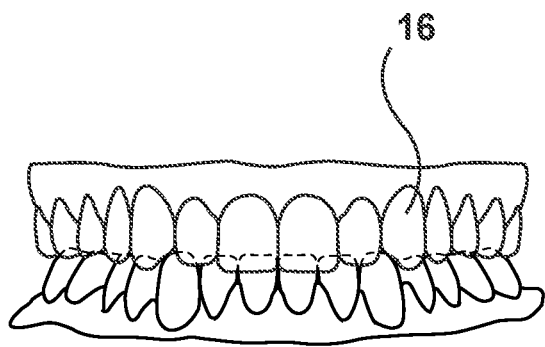

In certain embodiments, the method further comprises sending instructions to a display device, such as the display 202, operably connected to the processor 150, to display the collision as a pictorial representation of the collision or an alphanumerical representation of the collision (FIGS. 17A and 17B).

Orthodontic Appliance Output

In certain embodiments, the method 300 further comprises designing the orthodontic appliance 10 to administer the determined orthodontic treatment. The method 300 may further comprise sending instructions to a manufacturing apparatus, such as the manufacturing apparatus 130 operably connected to the processor 150, for making at least a component of the orthodontic appliance 10 to administer the determined orthodontic treatment.

Detecting Appliance-Tooth Collisions

In certain embodiments, the method 300 comprises detecting collisions between one or more teeth 16 of the subject, whether they be the upper teeth 16a or the lower teeth 16b) and the orthodontic appliance 10 associated with the teeth 16.

In such embodiments, the 3D model 312 further includes a representation of a simulated position of the orthodontic appliance 10 relative to the simulated position of the plurality of teeth 16, the 3D model 312 of the orthodontic appliance 10 comprising a point cloud representation of the orthodontic appliance 10. As before, the point cloud representation comprises a plurality of vector points 319 representative of the orthodontic appliance 10.

The method 300 comprises identifying whether there is collision between the orthodontic appliance 10 and the one or both of the upper teeth 16a and the lower teeth 16b in the simulated position by: in the 3D grid 326 in the simulation space 328 onto which the plurality of the vector points 319 representative of the upper teeth 16a and the lower teeth 16b have been mapped, identifying the cells 332 of the 3D grid 326 containing vectors points 319 representative of the one or both of the upper teeth 16a and the lower teeth 16b; identifying cells of the 3D grid 326 containing vectors points 319 representative of the orthodontic appliance 10; applying a first mask to the cells in the 3D grid which include vector points representative of the one or both of the upper teeth and the lower teeth; applying a second mask to the cells in the 3D grid which include vector points representative of the orthodontic appliance; and determining if there is at least one cell in the 3D grid which includes both the first mask and the second mask.

Detecting Appliance-Appliance Collisions

In certain embodiments, the method 300 comprises detecting collisions between a given one of the plurality of orthodontic appliances 10 (e.g. a first orthodontic appliance and a second orthodontic appliance) associated with the teeth 16 and one or more of the teeth 16. In some non-limiting embodiments of the present technology, the detection of collisions between the given one of the plurality of orthodontic appliances 10 (e.g. a first orthodontic appliance and a second orthodontic appliance) associated with the teeth 16 and one or more of the teeth 16 is done in addition to detection of collision between one or more of the teeth 16. In other non-limiting embodiments of the present technology, the appliance-teeth collision can be executed instead of the tooth-tooth collision detection.

In these embodiments, the method 300 differs from that of detecting the appliance-tooth collisions in that once the first and the second orthodontic appliance and the teeth have been mapped onto the 3D grid, the method 300 comprises identifying cells of the 3D grid containing vectors points representative of the first orthodontic appliance; identifying cells of the 3D grid containing vectors points representative of the second orthodontic appliance; applying a first mask to the cells in the 3D grid which include vector points representative of the first orthodontic appliance; applying a second mask to the cells in the 3D grid which include vector points representative of the second orthodontic appliance; and determining if there is at least one cell in the 3D grid which includes both the first mask and the second mask.

Advantageously, in certain embodiments of any of the above, as only a subset of all potential vector points are analyzed for collision, this can reduce the computational power requirements of the system.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining an orthodontic treatment for a subject, the method executable by a processor, the method comprising:
obtaining a 3D model of upper teeth of an upper archform and lower teeth of a lower archform of a subject, the 3D model representative of a simulated position of the upper teeth and the lower teeth following a simulated orthodontic treatment, the 3D model comprising a point cloud representation of the upper teeth and the lower teeth, the point cloud representation comprising a plurality of vector points representative of the upper teeth and the lower teeth;
identifying whether there is collision between the upper teeth and the lower teeth in the simulated position by:
in a 3D grid in a simulation space onto which the plurality of the vector points representative of the upper teeth and the lower teeth have been mapped,
identifying cells of the 3D grid containing vectors points representative of the upper teeth;
identifying cells of the 3D grid containing vectors points representative of the lower teeth;
applying a first mask to the cells in the 3D grid which include vector points representative of the upper teeth;
applying a second mask to the cells in the 3D grid which include vector points representative of the lower teeth;
determining if there is at least one cell in the 3D grid which includes both the first mask and the second mask; and selectively executing:
if the 3D grid does not include at least one cell which includes both the first mask and the second mask, determining that there is no collision between the upper teeth and the lower teeth, and determining the simulated orthodontic treatment as the determined orthodontic treatment,
if there is at least one cell in the 3D grid which includes both the first mask and the second mask, determining that there is collision between the upper teeth and the lower teeth, and adjusting the simulated orthodontic treatment.

2. The method of claim 1, further comprising transforming each vector point of the plurality of vector points into a vector sphere representative of the upper teeth and the lower teeth, the vector sphere comprising a sphere having a predetermined diameter and centered at each vector point.

3. The method of claim 1, wherein the obtaining the point cloud representation of the upper teeth and the lower teeth comprises obtaining a triangular mesh 3D model of the upper teeth and the lower teeth and converting the triangular mesh 3D model of the upper teeth and the lower teeth to the point cloud representation.

4. The method of claim 1, further comprising segmenting the 3D model of the upper teeth and the lower teeth to distinguish the upper teeth and the lower teeth.

5. The method of claim 1, further comprising iteratively updating the point cloud representation of the upper teeth and the lower teeth with an adjusted position of the upper teeth and the lower teeth following the adjusted simulated orthodontic treatment, and determining whether there is collision or not between the upper teeth and the lower teeth, until it is determined that there is no collision between the upper teeth and the lower teeth.

6. The method of claim 5, further comprising executing the adjusted simulation of the upper teeth and the lower teeth by adapting a simulated movement of at least one of: the upper teeth and the lower teeth from the simulated position to an adjusted simulated position.

7. The method of claim 6, wherein the adapted simulated movement is representative of a shorter distance of movement of the upper teeth and the lower teeth from one another to the adjusted simulated position.

8. The method of claim 1, further comprising obtaining the 3D model representative of the simulated position of the upper teeth and the lower teeth following the simulated orthodontic treatment by executing the simulation of the movement of the upper teeth and the lower teeth from an initial position to the simulated position.

9. The method of claim 1, further comprising detecting one or more of false positives and false negatives.

10. The method of claim 1, further comprising identifying a magnitude of collision of the upper teeth and the lower teeth, and adjusting the simulated position of the upper teeth and the lower teeth by an amount proportional to the identified magnitude of collision.

11. The method of claim 1, further comprising sending instructions to a display device operably connected to the processor to display the collision as a pictorial representation of the collision or as an alphanumerical representation of the collision.

12. The method of claim 1, further comprising designing the orthodontic appliance to administer the confirmed orthodontic treatment.

13. The method of claim 12, further comprising sending instructions to a manufacturing apparatus operably connected to the processor for making at least a component of the orthodontic appliance to administer the confirmed orthodontic treatment.

14. The method of claim 1, further comprising mapping the plurality of vector points representative of the upper teeth and the lower teeth onto the 3D grid of the simulation space.

15. The method of claim 1, further comprising segmenting the 3D model of one or both of the upper teeth and the lower teeth to distinguish individual teeth of one or both of the upper teeth and the lower teeth, and wherein the method comprises identifying whether there is collision between a given upper tooth of the upper teeth and a given lower tooth of the lower teeth by:
- identifying cells of the 3D grid containing vector points representative of the given upper tooth of the upper teeth;
- identifying cells of the 3D grid containing vectors points representative of the given lower tooth of the lower teeth;
  - applying a first mask to the cells in the 3D grid which include vector points representative of the given upper tooth of the upper teeth;
  - applying a second mask to the cells in the 3D grid which include vector points representative of the given lower tooth of the lower teeth;
  - determining if there is at least one cell in the 3D grid which includes both the first mask and the second mask.

16. The method of claim 1, wherein the 3D model representative of a simulated position of the upper teeth and the lower teeth following a simulated orthodontic treatment includes a 3D model of an orthodontic appliance associated with one or both of the upper and the lower teeth, the 3D model representative of a simulated position of the orthodontic appliance relative to the one or both of the upper teeth and the lower teeth, the 3D model of the orthodontic appliance comprising a point cloud representation of the orthodontic appliance, the point cloud representation comprising a plurality of vector points representative of the orthodontic appliance;
- identifying whether there is collision between the orthodontic appliance and the one or both of the upper teeth and the lower teeth in the simulated position by:
  - in a 3D grid in a simulation space onto which the plurality of the vector points representative of the upper teeth and the lower teeth have been mapped,
    - identifying cells of the 3D grid containing vectors points representative of the one or both of the upper teeth and the lower teeth;
    - identifying cells of the 3D grid containing vectors points representative of the orthodontic appliance;
    - applying a first mask to the cells in the 3D grid which include vector points representative of the one or both of the upper teeth and the lower teeth;
    - applying a second mask to the cells in the 3D grid which include vector points representative of the orthodontic appliance;
    - determining if there is at least one cell in the 3D grid which includes both the first mask and the second mask.

17. The method of claim 1, wherein the 3D model representative of a simulated position of the upper teeth and the lower teeth following a simulated orthodontic treatment includes a 3D model of a first orthodontic appliance and a second orthodontic appliance associated with one or both of the upper and the lower teeth, the 3D model representative of a simulated position of the first orthodontic appliance and the second orthodontic appliance relative to the one or both of the upper teeth and the lower teeth, the 3D model of the first orthodontic appliance and the second orthodontic appliance comprising a point cloud representation of the first orthodontic appliance and the second orthodontic appliance, the point cloud representation comprising a plurality of vector points representative of the first orthodontic appliance and the second orthodontic appliance;
- identifying whether there is collision between the first orthodontic appliance and the second orthodontic appliance in the simulated position by:
  - in a 3D grid in a simulation space onto which the plurality of the vector points representative of the upper teeth and the lower teeth have been mapped,
    - identifying cells of the 3D grid containing vectors points representative of the first orthodontic appliance;
    - identifying cells of the 3D grid containing vectors points representative of the second orthodontic appliance;
    - applying a first mask to the cells in the 3D grid which include vector points representative of the first orthodontic appliance;
    - applying a second mask to the cells in the 3D grid which include vector points representative of the second orthodontic appliance;
    - determining if there is at least one cell in the 3D grid which includes both the first mask and the second mask.

* * * * *